US011083328B2

(12) United States Patent
Cummer et al.

(10) Patent No.: US 11,083,328 B2
(45) Date of Patent: Aug. 10, 2021

(54) APPARATUS AND METHOD FOR FOAMING A BEVERAGE

(71) Applicant: STARBUCKS CORPORATION, Seattle, WA (US)

(72) Inventors: Michael Cummer, Seattle, WA (US); Izaak Koller, Seattle, WA (US)

(73) Assignee: STARBUCKS CORPORATION, Seattle, WA (US)

( * ) Notice: Subject to any disclaimer, the term of this patent is extended or adjusted under 35 U.S.C. 154(b) by 93 days.

(21) Appl. No.: 15/630,699

(22) Filed: Jun. 22, 2017

(65) Prior Publication Data

US 2018/0368610 A1    Dec. 27, 2018

(51) Int. Cl.
| | |
|---|---|
| *A47J 31/44* | (2006.01) |
| *A47J 31/41* | (2006.01) |
| *B01F 3/04* | (2006.01) |
| *A47J 31/00* | (2006.01) |
| *B01F 3/00* | (2006.01) |

(52) U.S. Cl.
CPC .......... *A47J 31/4485* (2013.01); *A47J 31/41* (2013.01); *A47J 31/44* (2013.01); *A47J 31/4489* (2013.01); *B01F 3/04787* (2013.01); *B01F 3/04794* (2013.01); *A47J 31/00* (2013.01); *B01F 3/00* (2013.01)

(58) Field of Classification Search
CPC ........ A47J 31/4485; A47J 31/41; A47J 31/44; A47J 31/4489; A47J 31/00; B01F 3/04787; B01F 3/04794; B01F 3/00
USPC ......................................................... 99/275
See application file for complete search history.

(56) References Cited

U.S. PATENT DOCUMENTS

| | | | | |
|---|---|---|---|---|
| 1,789,959 A | * | 1/1931 | Feeler | B65D 47/42 401/195 |
| 4,976,894 A | * | 12/1990 | Robinson | B01F 13/0033 141/330 |
| 5,865,104 A | | 2/1999 | Sham | |
| 6,006,654 A | | 12/1999 | Pugh | |

(Continued)

FOREIGN PATENT DOCUMENTS

| | | |
|---|---|---|
| EP | 1658796 A2 | 5/2006 |
| EP | 2409611 A1 | 1/2012 |

(Continued)

OTHER PUBLICATIONS

PCT Search Report and Written Opinion of the International Searching Authority of PCT/US2018/038599, dated Aug. 21, 2018; 15pgs.

(Continued)

*Primary Examiner* — Dana Ross
*Assistant Examiner* — Kuangyue Chen
(74) *Attorney, Agent, or Firm* — Knobbe, Martens, Olson & Bear, LLP

(57) ABSTRACT

Various beverage preparation systems and methods are disclosed. The beverage preparation system can include a container assembly configured to receive beverage, such as a milk. The container assembly can be removably engaged with a base. The container assembly can be temporarily removed from the base to facilitate transport of the beverage residing therein. The container assembly can be configured to receive a flow of steam, air, or additional gasses and vapors when the container assembly is mounted on the base.

9 Claims, 18 Drawing Sheets

(56) References Cited

U.S. PATENT DOCUMENTS

| | | |
|---|---|---|
| 6,158,328 A | 12/2000 | Cai |
| 6,840,163 B2 | 1/2005 | Oldani et al. |
| 6,901,848 B2 | 1/2005 | Beretta |
| 7,021,206 B2 | 4/2006 | Eckenhausen et al. |
| 7,318,372 B2 | 1/2008 | Cooke |
| 7,487,711 B2 | 2/2009 | Carbonini |
| 7,600,467 B2 | 10/2009 | Coccia et al. |
| 8,003,148 B2 | 8/2011 | Schödler |
| 8,403,306 B2 | 3/2013 | Stahl et al. |
| 8,515,574 B2 | 8/2013 | Studor et al. |
| 8,657,262 B2 | 2/2014 | Burri et al. |
| 8,661,968 B2 | 3/2014 | Turi et al. |
| 8,991,795 B2 | 3/2015 | Studor et al. |
| 9,474,408 B2 | 10/2016 | Dollner et al. |
| 10,258,191 B2 | 4/2019 | Apone et al. |
| 2002/0023543 A1 | 2/2002 | Schmed |
| 2006/0037481 A1* | 2/2006 | Bicht .............. A47J 31/545 99/279 |
| 2006/0140595 A1 | 6/2006 | Grabowski |
| 2007/0089612 A1 | 4/2007 | Coccia et al. |
| 2007/0181003 A1 | 8/2007 | Bardazzi |
| 2009/0255415 A1 | 10/2009 | Cheng et al. |
| 2010/0064899 A1 | 3/2010 | Aardenburg |
| 2010/0107891 A1 | 5/2010 | Vanderstegen-Drake et al. |
| 2010/0192785 A1 | 8/2010 | Krauchi |
| 2010/0193528 A1 | 8/2010 | Davidson |
| 2010/0263545 A1 | 10/2010 | Morgan |
| 2010/0303983 A1* | 12/2010 | Rodriguez .............. A47J 31/44 426/431 |
| 2010/0323074 A1 | 12/2010 | Fliegauf et al. |
| 2012/0073449 A1 | 3/2012 | Volonté et al. |
| 2013/0040028 A1 | 2/2013 | Doppe et al. |
| 2015/0104548 A1 | 4/2015 | Yip |
| 2015/0336736 A1 | 11/2015 | Cabilli |
| 2016/0000259 A1 | 1/2016 | Studor et al. |
| 2016/0058238 A1 | 3/2016 | Purton |
| 2016/0235243 A1 | 8/2016 | Grassia et al. |
| 2016/0367071 A1 | 12/2016 | Dollner et al. |
| 2017/0079468 A1 | 3/2017 | Apone et al. |
| 2017/0079469 A1 | 4/2017 | Apone et al. |
| 2017/0164644 A1 | 6/2017 | Steiner |
| 2017/0359996 A1 | 12/2017 | Adriaens |
| 2017/0367525 A1 | 12/2017 | Buchholz et al. |
| 2018/0368610 A1* | 12/2018 | Cummer ............. A47J 31/4485 |
| 2019/0008313 A1 | 1/2019 | Steiner |
| 2019/0008314 A1 | 1/2019 | Steiner |
| 2019/0350403 A1 | 11/2019 | Steiner |

FOREIGN PATENT DOCUMENTS

| | | | |
|---|---|---|---|
| EP | 2446788 A1 | 5/2012 | |
| EP | 3051988 A1 | 8/2016 | |
| GB | 2493447 A | 2/2013 | |
| GB | 2493447 A * | 2/2013 | ............ A47J 43/046 |
| WO | WO 01/97668 A1 | 12/2001 | |
| WO | WO 2010/121299 A1 | 10/2010 | |
| WO | WO 2011/048078 A2 | 4/2011 | |
| WO | WO 2014/036697 A1 | 3/2014 | |
| WO | WO 2015/003969 A1 | 1/2015 | |
| WO | WO 2015/042652 A1 | 4/2015 | |
| WO | WO 2016/097923 A1 | 6/2016 | |
| WO | WO 2016/150731 A1 | 9/2016 | |
| WO | WO 2016/154662 A1 | 10/2016 | |
| WO | WO 2016/207850 A1 | 12/2016 | |
| WO | WO 2017/003288 A1 | 1/2017 | |
| WO | WO 2017/155401 A1 | 9/2017 | |
| WO | WO 2020/051037 A1 | 3/2020 | |

OTHER PUBLICATIONS

PCT Search Report and Written Opinion of the International Searching Authority of PCT/US2019/048525, dated Nov. 11, 2019; 24 pgs.

* cited by examiner

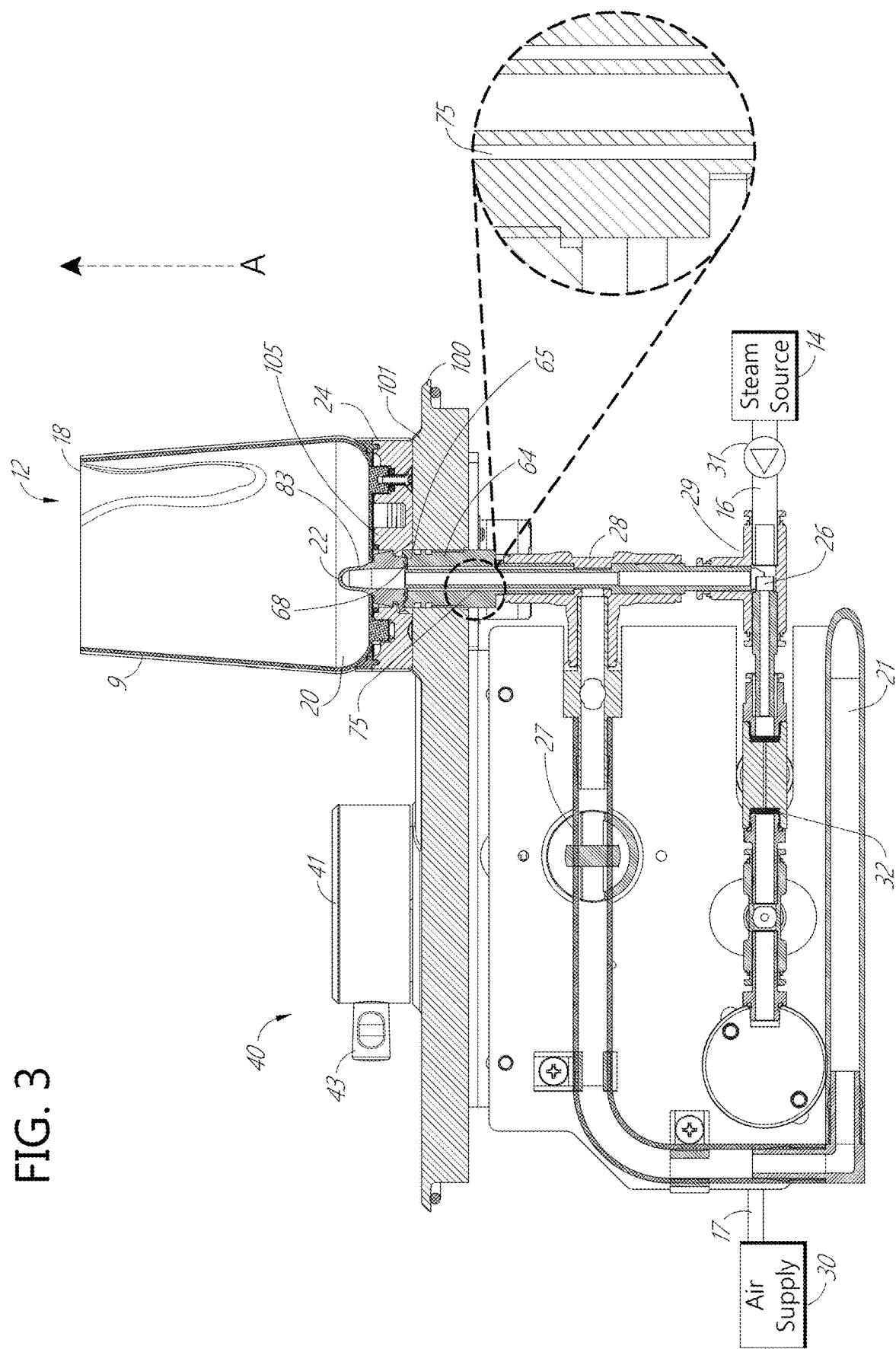

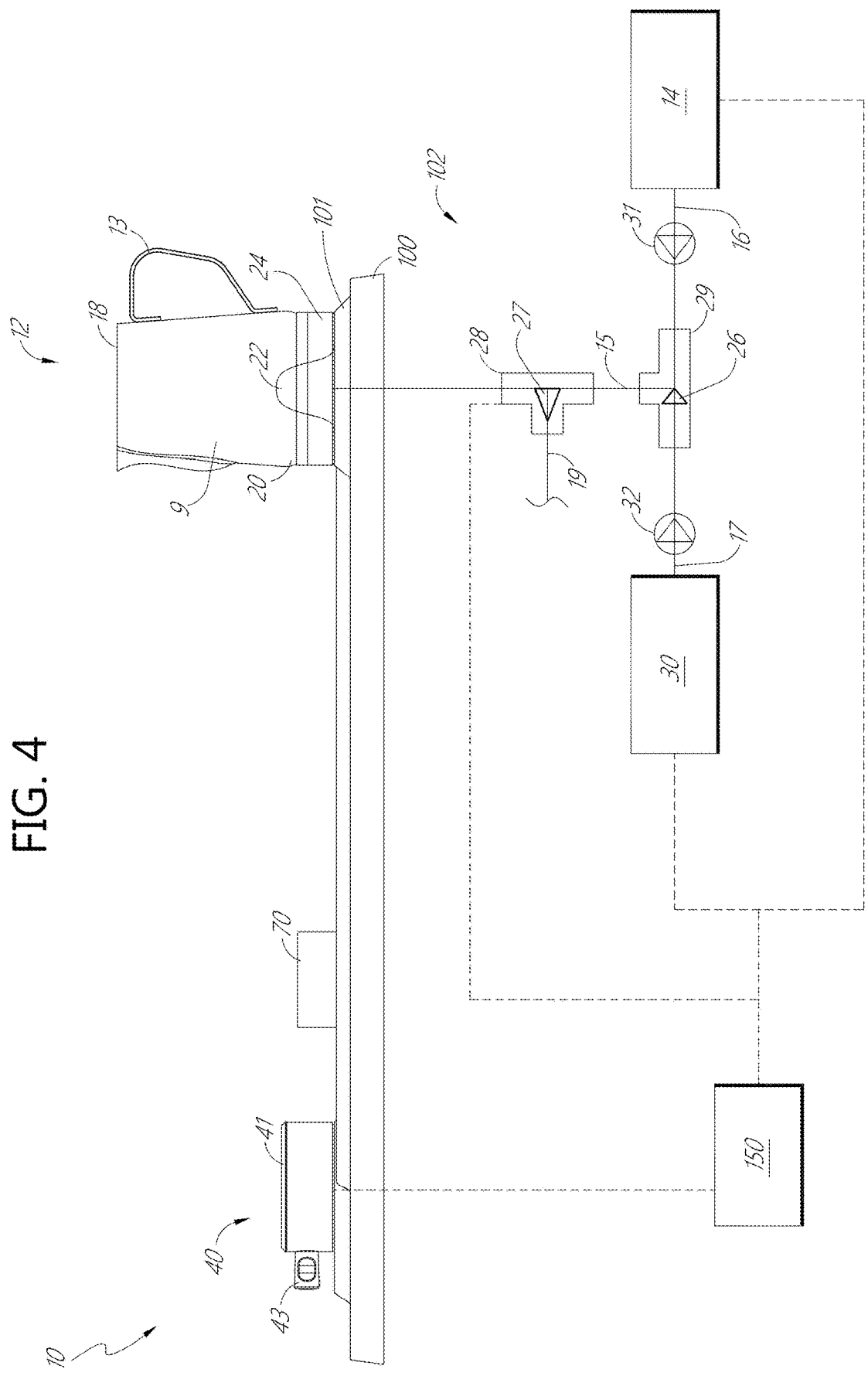

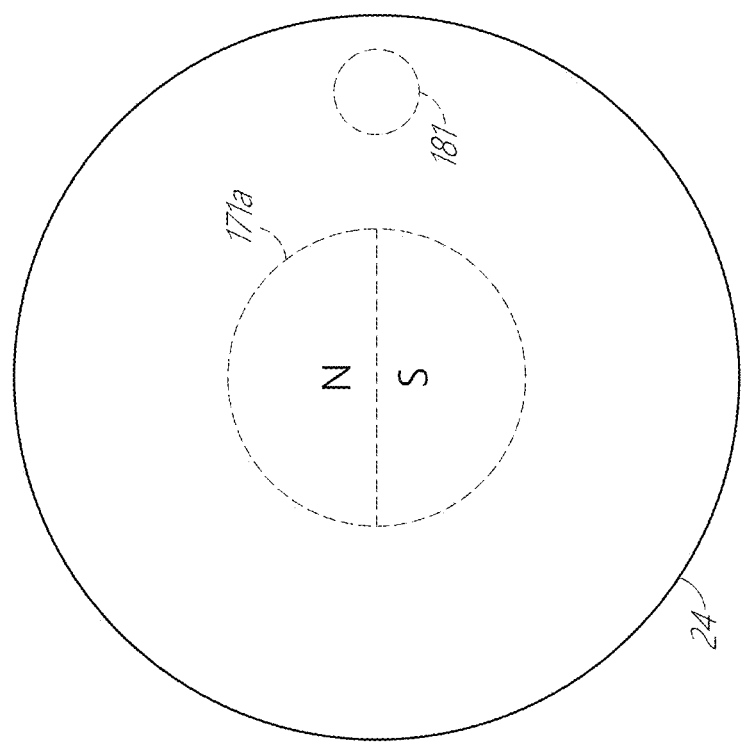
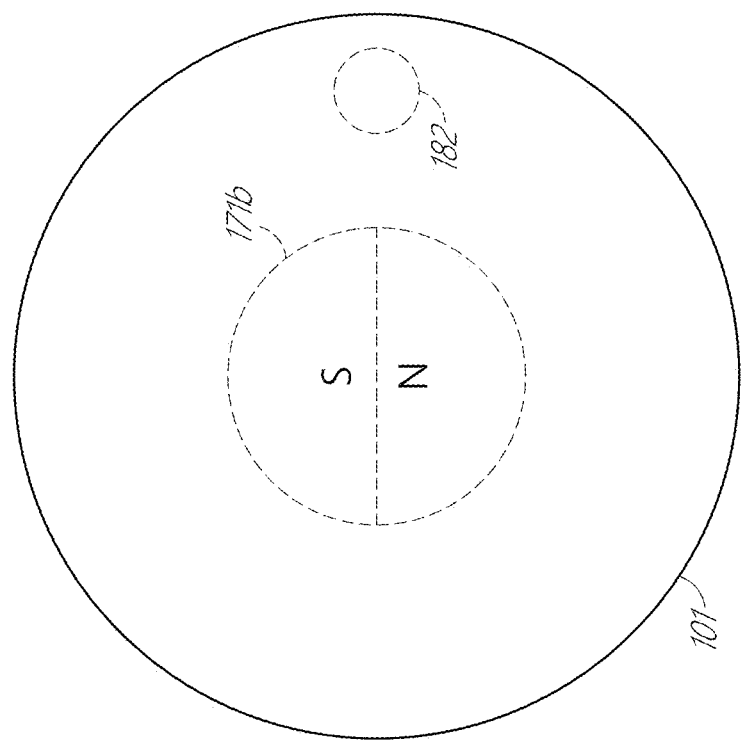
FIG. 10A

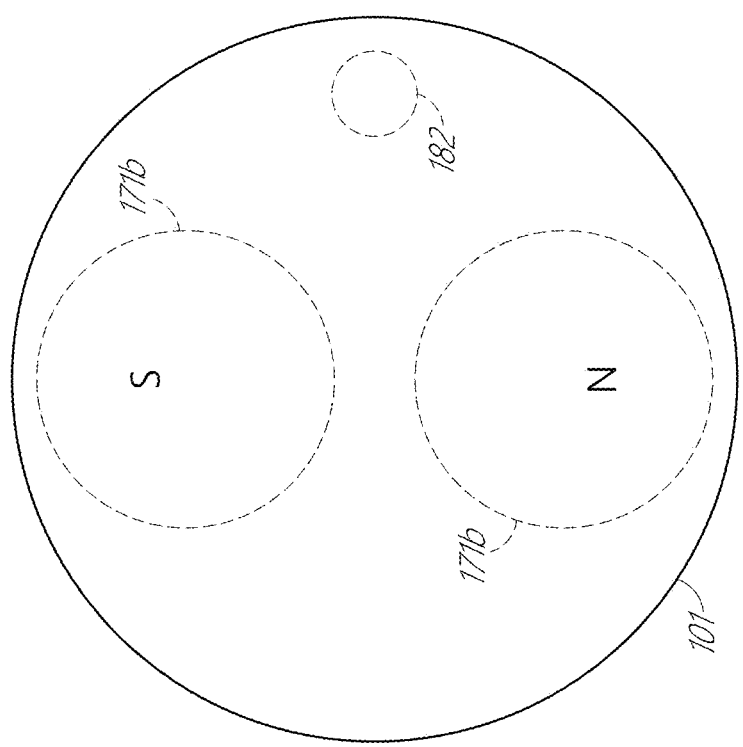
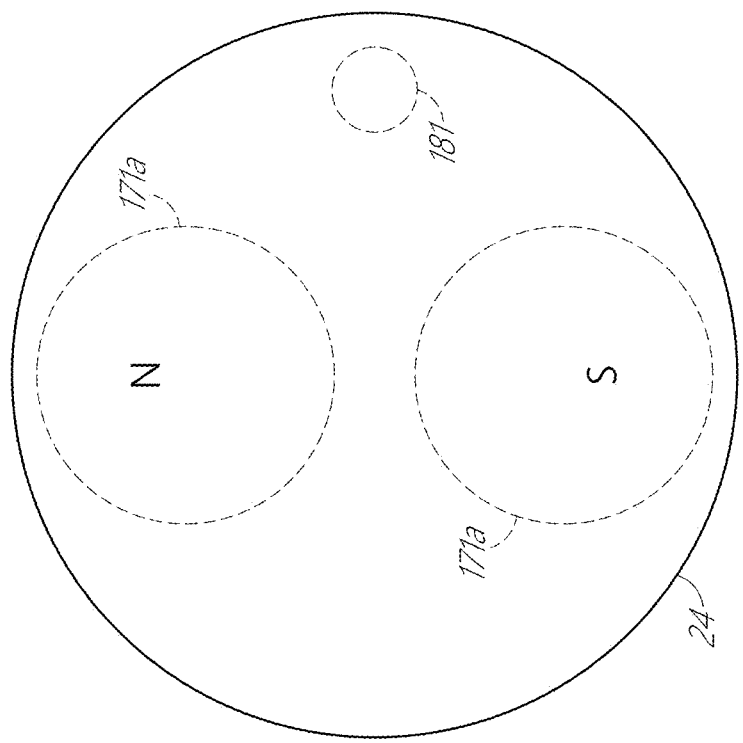
FIG. 10B

APPARATUS AND METHOD FOR FOAMING A BEVERAGE

FIELD

The present disclosure relates to systems and methods for preparing beverages, such as systems and methods for foaming a milk or a milk product with steam.

DESCRIPTION OF CERTAIN RELATED ART

The process of steaming milk is well known part of creating certain café beverages. In most applications, a steam wand is immersed into a milk or milk product that is held within a container assembly. The steam can heat the milk and by varying the depth of the steam wand in the milk the user can generate froth in and/or over the milk. The heated and frothed milk can be added to beverage ingredients (e.g., espresso) to create certain café beverages. While such known techniques are useful, there is a continued desire to improve the quality of the final milk product and the process of creating the milk product.

BRIEF DESCRIPTION OF THE DRAWINGS

Various embodiments are depicted in the accompanying drawings for illustrative purposes, and should in no way be interpreted as limiting the scope of the embodiments. Various features of different disclosed embodiments can be combined to form additional embodiments, which are part of this disclosure.

FIG. 3 illustrates a partial cross-sectional view of the beverage preparation system of FIG. 1A FIG. 4 illustrates a simplified schematic view the beverage preparation system of FIG. 1A.

FIGS. 10A-B depict a schematic view of the orientation of magnets which can be disposed within a pitcher and seat of a beverage preparation system.

DETAILED DESCRIPTION OF CERTAIN EMBODIMENTS

Various beverage preparation systems and methods are described below to illustrate various examples that may achieve one or more desired improvements. These examples are only illustrative and not intended in any way to restrict the general disclosure presented and the various aspects and features of this disclosure. The general principles described herein may be applied to embodiments and applications other than those discussed herein without departing from the spirit and scope of the disclosure. Indeed, this disclosure is not limited to the particular embodiments shown, but is instead to be accorded the widest scope consistent with the principles and features that are disclosed or suggested herein. In many of the embodiments described herein, the beverage preparation system is described as heating and/or creating foam within milk or a milk product by adding steam and/or air to the milk or milk product. However, it should be appreciated that certain features and aspects of the embodiments disclosed herein may be applicable to other beverages besides milk or milk product and thus the description herein is not limited to milk or milk products.

Although certain aspects, advantages, and features are described herein, it is not necessary that any particular embodiment include or achieve any or all of those aspects, advantages, and features. Some embodiments may not achieve the advantages described herein, but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable.

Figure 1A:
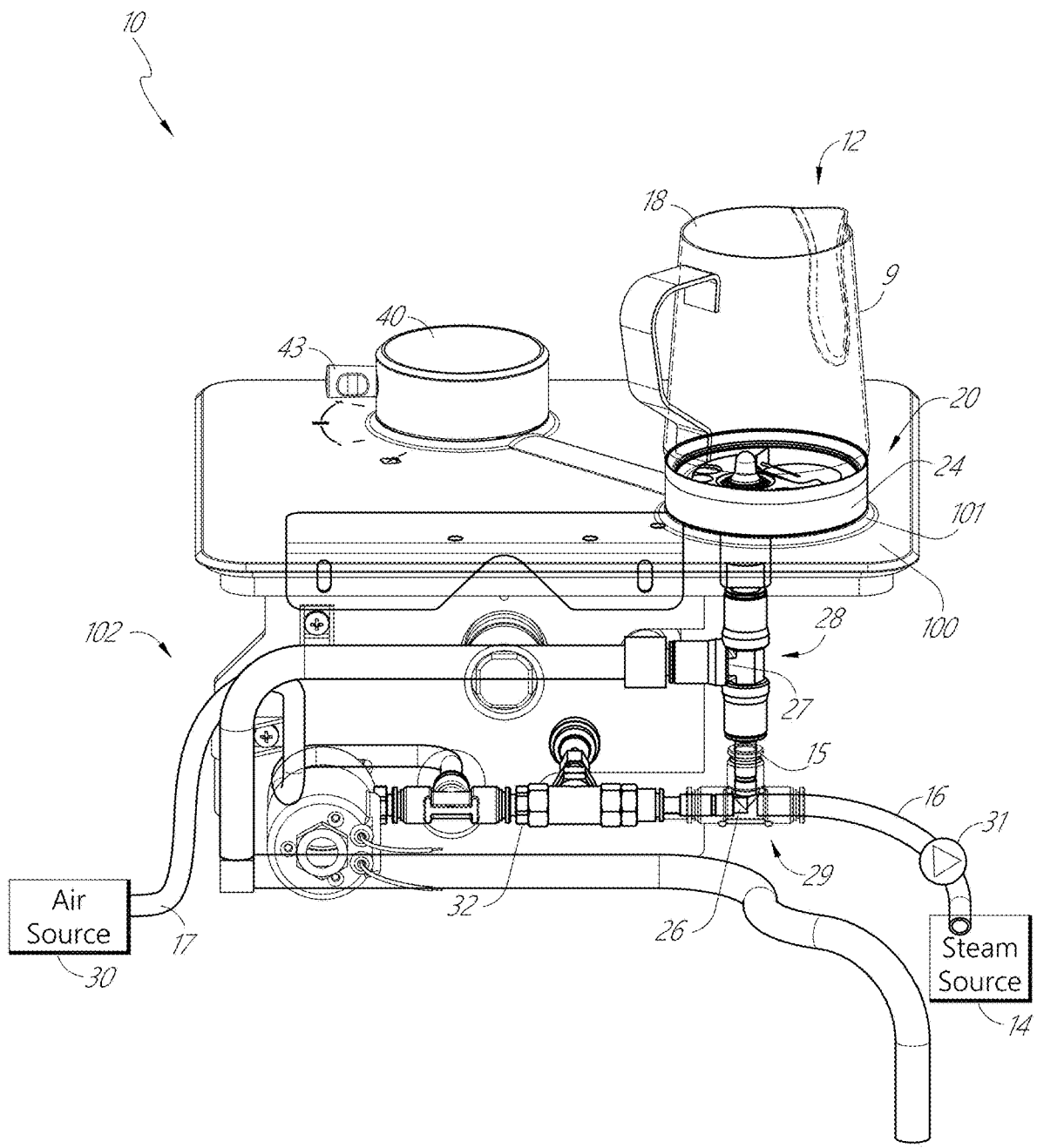
FIG. 1A is top perspective view of a beverage preparation system.

FIG. 1A illustrates an embodiment of a beverage preparation system 10. To facilitate presentation, the system 10 is discussed in the context of foaming milk and/or a milk product that can be used to create café beverages such as, for example, a latte or cappuccino. However as noted above, certain features and aspects of the disclosure can be applied in other contexts as well, such as heating and/or creating foam in other types of products and/or creating other types of beverages.

As illustrated, the system 10 can include a container assembly 12. In some embodiments, the container assembly 12 is configured to contain milk or a milk product which will be heated and/or foamed as described herein. The container assembly 12 can receive a single serving of milk or milk product and, in some variants, the container assembly 12 is configured to contain multiple servings of milk or milk product. Accordingly, the container assembly 12 may be implemented in a variety of configurations, such as a jug, carafe, decanter, or any suitable apparatus for containing a liquid. The container assembly 12 may be constructed from a variety of materials including glass, plastic, metal, and other materials suitable for holding liquid. In certain embodiments, the container assembly 12 may be made from stainless steel, or another suitable metal.

Figure 2:
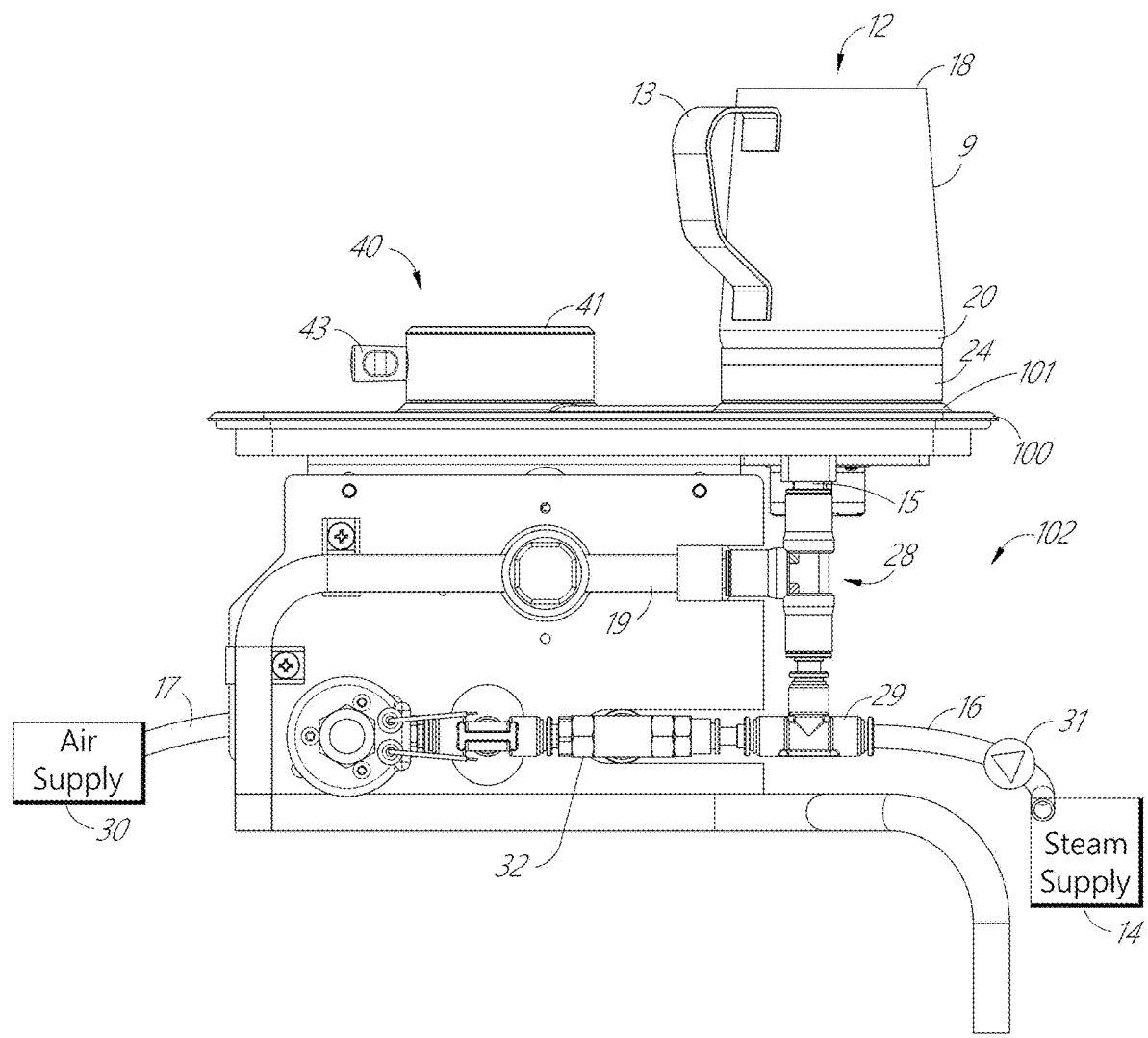
FIG. 2 depicts a side view of the beverage preparation system of FIG. 1A

In the embodiment illustrated in FIG. 1A, the container assembly includes pitcher 9. The pitcher 9 can include a handle 13 disposed on the exterior of the container assembly 12 to facilitate transport and handling of the container assembly 12. The pitcher 9 further includes a generally open first or upper end 18 through which a liquid may be introduced into the interior of the container assembly 12. As further depicted in FIG. 1A, a closed second or lower end 20 is disposed generally opposite the open first or upper end 18. The closed lower end 20 of the pitcher 9 can be coupled to a base assembly 24 (also referred herein as "base") as shown in FIGS. 2 and 3.

With continued reference to FIG. 3, the base assembly 24 can house certain components of the container assembly 12.

For example, the base assembly 24 can include a temperature sensor (not pictured). In certain configurations, the temperature sensor may further include a wireless transmitter configured to transmit information relating the temperature of the product contained within the container assembly 12. In some embodiments, the system 10 can be configured to prevent the initiation of an aeration and/or heating operation if communication with the temperature sensor is interrupted. Similarly, the base assembly 24 may house, in part, a nozzle 22. As shown in FIG. 3, the nozzle 22 may extend into container assembly 12. In certain configurations, the nozzle 22 may be implemented in the form of check valve, as will be discussed in more detail below.

As shown in FIG. 5, the nozzle 22 can have a first or upper end 61 that extends into the interior of the container assembly 12. The upper end 61 of nozzle 22 may be rounded. The nozzle 22 may further include a second or bottom end 62, which can form an opening at the bottom of the base assembly 24. As will be explained below, the bottom end of the nozzle 22 can form a gasket. The nozzle can be formed of an elastomeric material and in some embodiments can be formed of a single piece of elastomeric material.

Figure 5A:
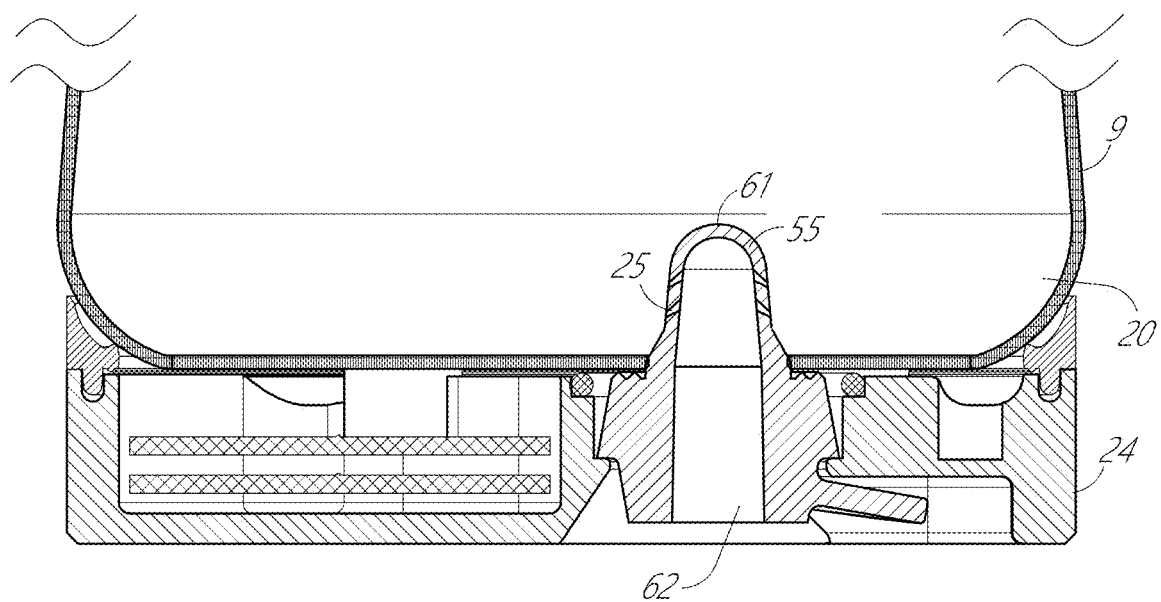
FIG. 5A is a cross-sectional side view of a lower portion of an embodiment of a container assembly that can be used with the beverage preparation system of FIG. 1A.
Figure 5B:
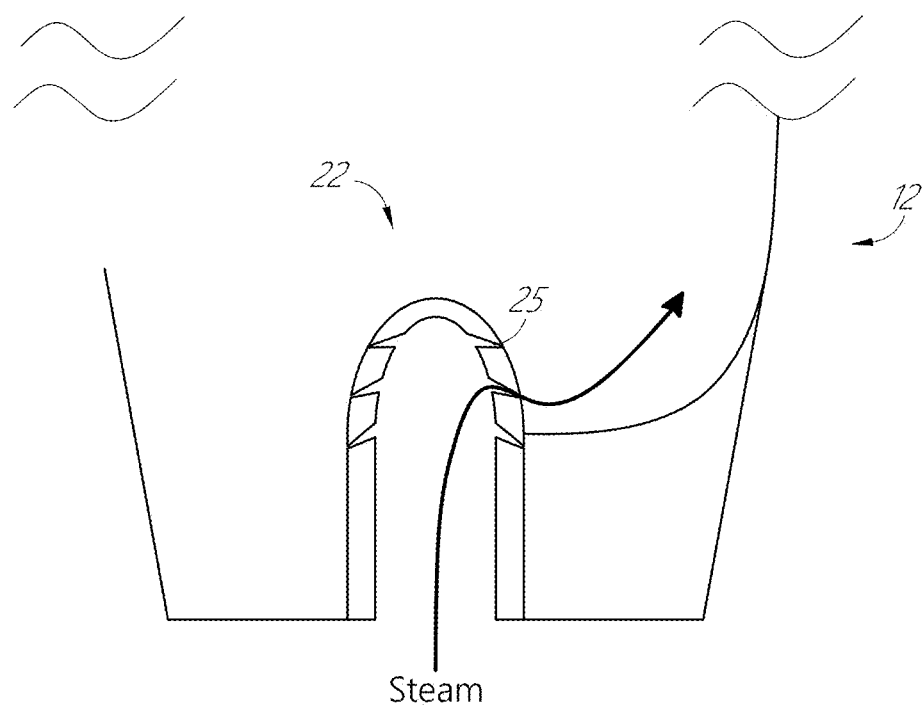
FIG. 5B is a cross-sectional side view of a lower portion of another embodiment of a container assembly that can be used with the beverage preparation system of FIG. 1A.
Figure 5C:
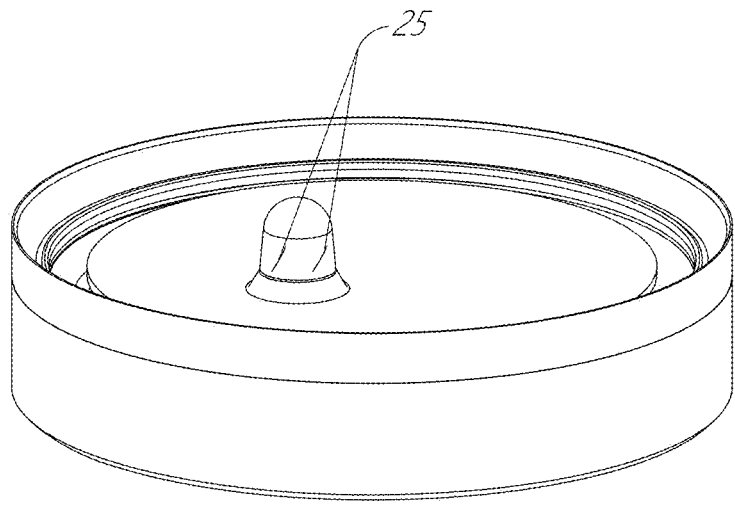
FIG. 5C is a perspective view of an embodiment nozzle that can be with an embodiment of a container assembly.
Figure 5D:
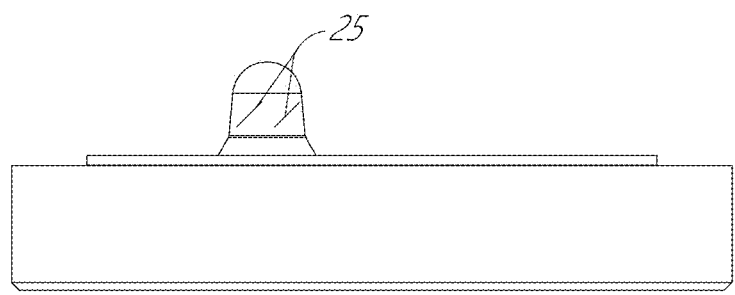
FIG. 5D is a perspective view of an embodiment nozzle that can be with an embodiment of a container assembly.

As shown in FIG. 5C, the nozzle 22 can include apertures which can comprise slits 25 through which air and/or steam may flow into the interior of container assembly 12. Likewise, depicted in FIG. 5D is a side view of nozzle 22 where the slits 25 can be seen. The slits 25 can be configured to open or "crack" at a selected pressure. In this manner, the nozzle 22 can operate as a check valve that only allows steam and/or air to enter into the container assembly 12 if the pressure in the nozzle 22 exceeds a certain threshold. For instance, as depicted in FIG. 5A, the nozzle 22 includes a plurality of slits 25 that are configured to crack open at a selected pressure. Likewise, FIG. 5B depicts the plurality of slits 25 cracked open in response to a flow of air and/or steam of sufficient pressure. In the illustrated embodiment of FIGS. 5C and 5D, the slits 25 can have horizontal axis and can extend at a 45 degree orientation on the nozzle 22.

The bottom end 62 of the nozzle 22 can rest upon a valve seat 64 (see FIG. 3). In certain implementations, the valve seat 64 can be configured to extend through an opening in a base 101, disposed on top of a platform 100 as shown in FIGS. 1A and 3. As will be described below, the valve seat 64 can provide an interface that connects the nozzle 22 to a steam supply system 102 (also referred to as "steam supply" or "steam supply unit"), which may be configured to include at least one of a steam source 14 and an air source 30. In certain arrangements, steam and/or air can flow up through the valve seat 64, into the nozzle 22, and then into the interior of the container assembly 12 to heat and/or aerate liquid (e.g., milk or a milk product) contained within the container assembly 12. In certain implementations, the introduction of steam and/or air can induce movement of the liquid within the container assembly 12, which can facilitate heating, aeration, and/or mixing of the liquid contained within the container assembly 12.

As illustrated in FIG. 2, the base 101 supports the container assembly 12 on the platform 100. The platform 100 can include least one of a user interface 40, and/or a display 70, as depicted in FIG. 1C. In the illustrated embodiment, the display 70 can comprise a gauge with one or more dials. In other embodiments, the user interface 40, and/or the display 70 can be located in other positions and in certain embodiments be remote from the container assembly 12. The user interface 40 can allow a user to control operation of the system 10 to alter the physical characteristics of a liquid residing within container assembly 12. Likewise, the display 70 can display information regarding various physical properties of the liquid residing within container assembly 12. For instance, in certain configurations, the user interface 40 can be manipulated to module, regulate, or otherwise control a flow of steam and/or air from the steam supply system 102 into the container assembly 12. The flow of steam and/or air may heat and/or aerate the liquid residing in the container assembly 12. The display 70 can display the temperature of the liquid residing within the container assembly 12, or display information regarding duration or amount of air, steam, or a combination thereof delivered to the container assembly. As depicted in FIG. 3, the steam supply system 102 can be positioned below or partially below the platform 100. Accordingly, in certain implementations, a user of the system 10 may modulate the flow and/or amount of steam and/or air to produce desired characteristics of the foam created in the container assembly 12. The actual components of the steam supply system 102 can be positioned below the platform 100 and out of view of the user. Further details and aspects of the steam supply system 102 and the user interface 40 will be described below.

Figure 1B:
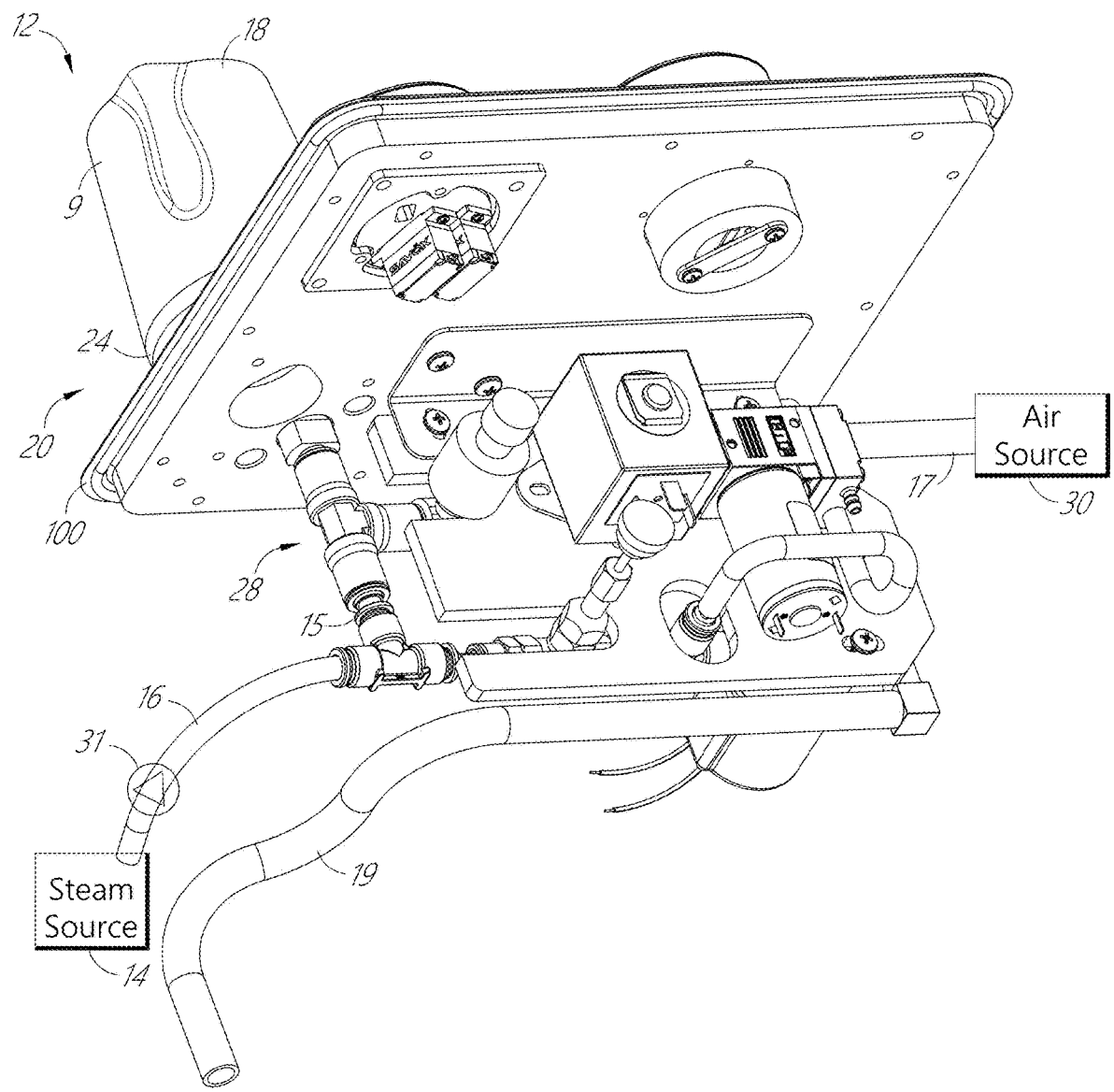
FIG. 1B is a bottom perspective view of the beverage preparation system of FIG. 1A.
Figure 1C:
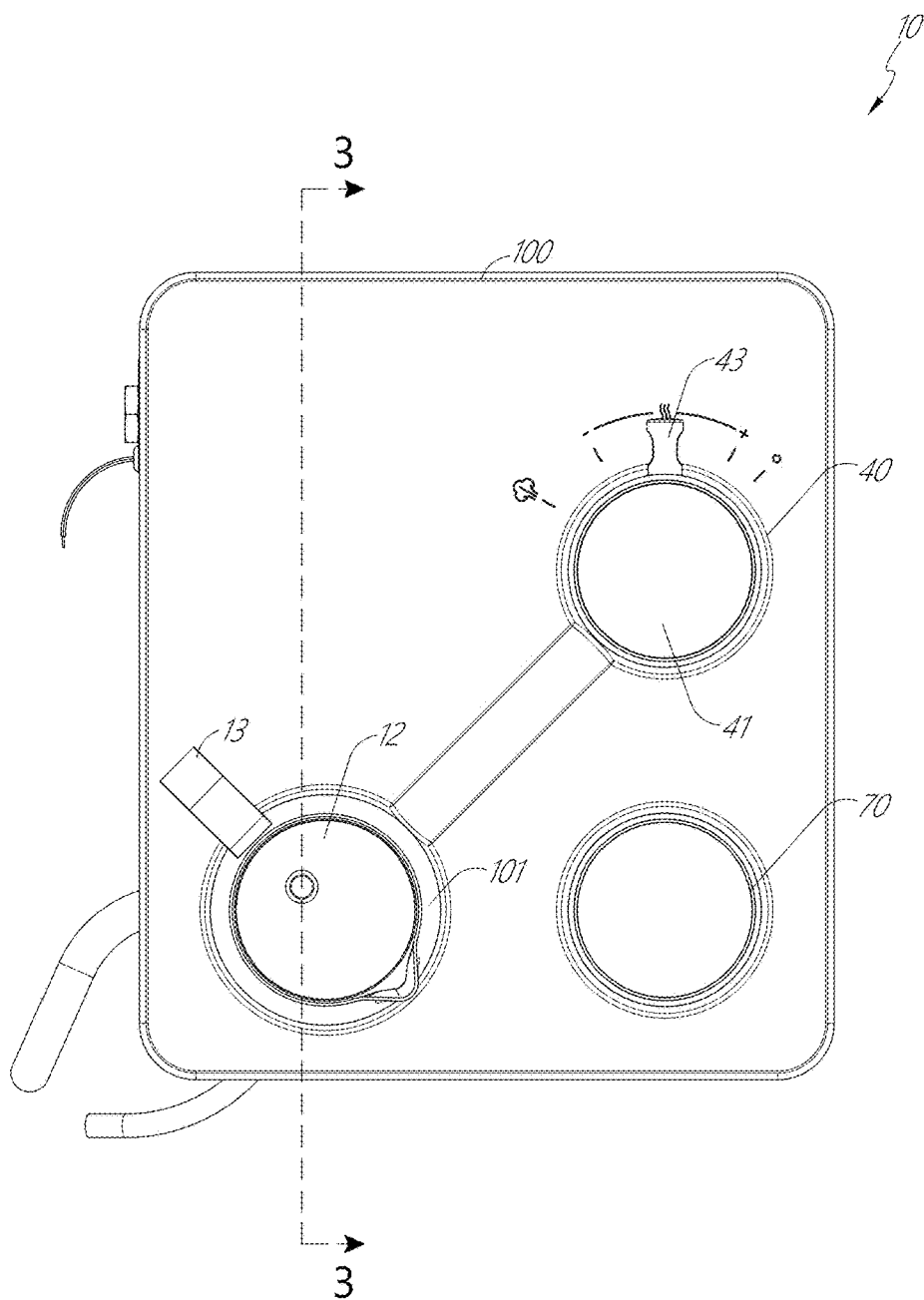
FIG. 1C is a top view of the beverage preparation system of FIG. 1A

As shown in FIG. 1B, the steam supply system 102 can be disposed below the platform 100, generally opposite the container assembly 24. In this manner, the steam supply system 102 is not generally visible from the top of the device, as shown in FIG. 1C. As noted above, the steam supply system 102 can include the steam source 14 and the air source 30. The steam source 14 and the air source 30 (also referred to as "air supply") can provide air and/or steam to the container assembly 12. As shown in FIGS. 2 and 3, the steam source 14 can be provided with a valve 31 to control the amount of steam flowing into a steam supply conduit 16. In one configuration, the valve 31 may be a proportional solenoid valve. Like the steam source 14, the air source 30 can be provided with a valve 32. The valve 32 may be used to control the amount of air flowing through an air supply conduit 17. In certain configuration, the valve 32 may be a needle valve.

With continued reference to FIG. 3, the steam supply conduit 16 and the air supply conduit 17 can be connected to a steam and air conduit 15 by a T-connection 29. In turn, the steam and air conduit 15 may be connected to the valve seat 64 to facilitate the introduction of steam and/or air into the container assembly 12 through the nozzle 22. As best seen in FIG. 3, within the T-connection 29, a one-way valve 26 can be provided at the outlet to the air supply conduit 17. In one embodiment, the one-way valve 26 is in a duck-bill valve. The one-way valve 26 can prevent steam from the steam source 14 from flowing down the air supply conduit 17 towards the air source 30. In the embodiment depicted, the one-way valve 26 is positioned within the T-connection 29 near or below the inlet to the air and steam supply conduit of T-connection 29. By positioning the one-way valve 26 within the T-connection near or below the inlet to the air and steam supply conduit, lingering air that may be resident in the T-connection, as well as air resident in the steam and air conduit 15, can be purged from the passageway, as will be explained in more detail below. Such an arrangement helps to prevent the formation of undesirable large air bubbles in the container assembly 18.

The air and steam conduit 15 can extend upwardly through the valve seat 64 to form an steam outlet 83 at the upper surface 105 of the base 101. In certain configurations, the valve seat 64 can also form an exhaust path 19. For example, in the embodiment illustrated in FIG. 3, the exhaust path 19 is formed by an annular gap 75 that extends around the steam and air conduit 15 forming an exhaust inlet on the base 24 through the valve seat 64. As shown in FIG. 3, the exhaust path 19 can be connected to an exhaust fitting 28, which in turn is connected to an exhaust conduit 21. The exhaust conduit 21 may be opened or closed to facilitate or inhibit the flow of steam and/or air into the exhaust path 19 using the exhaust valve 27. The exhaust valve 27 may be used to close the pathway to the exhaust conduit 19, thereby producing a build-up of pressure within the steam and air conduit 15. In a similar manner, the exhaust valve 27 may opened to allow steam, air, or a combination thereof, to flow into the exhaust path 19, thereby reducing the pressure in the steam and air conduit 15. Advantageously, this configuration allows air to be purged from the air and steam conduit 15 either before or after operation of the system 10.

Figure 6:
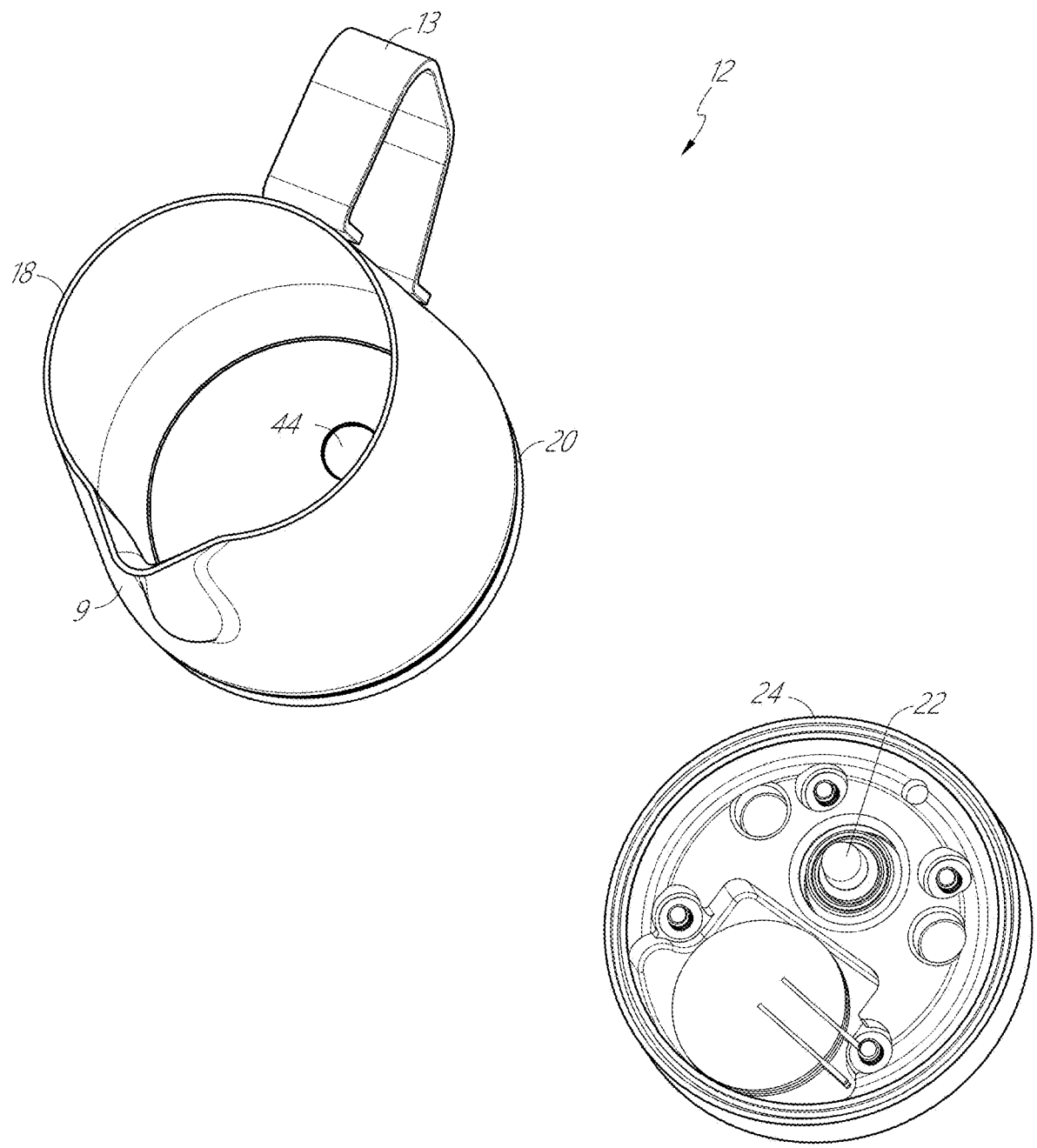
FIG. 6 is an exploded view of an embodiment of a container assembly.

Depicted in FIG. 5A is a detailed view of the bottom end 20 (e.g., bottom) of the container assembly 12. As shown in FIGS. 5 and 6, the second end 20 of the pitcher 9 comprises the opening 44, though which the nozzle 22 extends. The bottom end 62 of the nozzle forms a gasket 68, which can mate with a top surface 65 of the corresponding valve seat 64 in the platform 100, best seen in FIG. 3.

The opening 44 can include a sealing member (e.g., an O-ring, gasket, or other type of seal) configured to provide a generally liquid-tight seal between the pitcher 9 and the base assembly 24. As shown in FIGS. 5 and 6, the nozzle 22 can extend into the interior of the pitcher 9. For instance, as best shown in FIG. 6, the nozzle 22 can be configured to protrude through, and seat against, the opening 44. In certain embodiments, the nozzle 22 can include the slits or apertures 25 as mentioned above that in certain embodiments can function as one-way valves. Thus, the liquid in the interior of the pitcher 9 can be inhibited or prevented from escaping out of the second or bottom end 20 of pitcher 9 when disengaged from the base 101.

As discussed above, the container assembly 12 can receive a flow of air and/or steam through the nozzle 22. The liquid tight seal provided by the nozzle 22 advantageously prevents fluid resident in the pitcher 9 from escaping out of the bottom end 20 through the opening 44 towards base assembly 24. Moreover, as pictured in FIG. 5, the nozzle 22 can be further configured to direct the flow of air and/or steam into the interior of the pitcher 9 to facilitate the heating and/or aeration operation.

Depicted in FIG. 5B is a close-up view of an embodiment of the slits 25. In some embodiments, the slits 25 allow gas and vapor received into the nozzle 22 from the steam outlet to proceed into the container assembly 12. As depicted in FIG. 5B, the slits 25 can be oriented to direct the flow of gas and vapor outwards and downwards towards the bottom end 20, and perimeter of the pitcher 9 and can be in the form of downward slits 25 formed in the wall 55 of the nozzle 22. In this manner, the flow of air and/or steam may be dispersed downwardly, allowing the liquid residing in the container assembly 12 to be heated and/or aerated in a more uniform manner. Moreover, in some embodiments, the nozzle 22 can be configured to inhibit the flow of gas or until the flow has reached a certain minimum threshold pressure by configuring size and configuration of the various slits 25 disposed on nozzle 22. Thus, in certain embodiments, the slits 25 remain closed until the pressure increases above a threshold value. Once the pressure exceeds the threshold value, the slits 25 can open to allow steam and/or air to enter the container assembly. In one embodiment, the threshold pressure for opening the slits 25 is about 1 psi. As noted above, in FIGS. 5C and 5D, the slit 25 direct flow along a horizontal axis but can extend along a 45 degree orientation on the nozzle 22.

In modified embodiments, the slits 25 can direct flow downwards as mentioned above, upwardly and/or horizontally. Such slits 25 can also extend along the nozzle at 45 degrees orientation along the nozzle, vertically and/or horizontally in various embodiments.

As explained above, when the pinch valve 27 in the exhaust conduit 19 is in an open position, the steam and/or air flowing up from through the steam and air conduit 15 will not "crack" open the openings in the valve. In this manner, steam and air is directed up towards the nozzle 22 and then down through the annular exhaust gap 75, through the exhaust conduit 19. Conversely, when the valve 27 in the exhaust conduit 19 is closed, pressure at the nozzle 22 will increase until the apertures 25 in the nozzle "crack" or open. In this manner, with the exhaust valve in the open position, air can be initially purged from the system 10. Afterwards, the exhaust valve 27 can be closed to begin directing higher pressure steam and air to the container assembly 12.

Depicted in FIG. 4 is a schematic view of the beverage preparation system 10 which has been described above. Accordingly, corresponding components of the beverage preparation system 10 shown in FIG. 4 are provided with the same reference numbers as found above and reference can be made to the description above. As shown in FIG. 4 and described above, the beverage preparation system 10 includes the container assembly 12 that can be removably interfaced with base 101. As noted above, the air and steam supply system 102 comprises the steam supply source 14 and the air supply source 30. The valve 31 can be used to control the release of steam from steam source 14, and therefore, affect the flow of steam into the T-connection 29. Like the steam source 14, the valve 32 can control the flow of air into T-connection 29.

As noted above, within the exhaust conduit 19 is the exhaust valve 27. The exhaust valve 27 can be used in conjunction with slits 25 of nozzle 22 to allow steam and air conduit 15 to be purged of latent air or steam resident in the pathways from previous operation cycles as previously described. For example, by routing the flow of steam and/or air away from the nozzle 22, the air resident in the air and steam conduit 15 may be expelled from the passageway.

Also depicted schematically in FIG. 4 is the user interface 40. As noted above, the user interface 40 allows a user to control certain aspects and operations of the beverage preparation system 10. The user interface 40 can be implemented in a variety of configurations, such as one or more dials, knobs, levers, buttons, switches, touchscreens, or other suitable control schemes. The user interface 40 may be in communication with, or otherwise coupled to one or more of the valves discussed above. For instance, in certain configurations, the user interface 40 may be mechanically coupled to at least one of the steam valve 31, the air valve 32, the T-connection valve 26, and/or the exhaust valve 27 to control or regulate the flow of steam and/or air into the container assembly 12. In other embodiments as shown in FIG. 4, the user interface 40 may be coupled with a control system 150, which in turn may be connected or otherwise coupled to the aforementioned valves.

In the embodiment depicted in FIG. 4, the user interface 40 is in communication with the control system 150. As depicted, the control system 150 controls operation of the steam valve 31, the air valve 32, the T-connection valve 26, and the exhaust valve 27, as indicated by the dashed lines. In this manner, the flow of steam and/or air into the container assembly 12 can be controlled by manipulating the user interface 40. For instance, user input received through the user interface 40 may be communicated to the control system 150, and in turn, the control system 150 may open or close the steam valve 31 to increase, decrease, or halt the flow of steam into T-connection 29. In a similar manner, the air valve 32 can be opened or closed by modulating the user interface 40 to affect the control system 150, in turn the exhaust valve 27 disposed within exhaust conduit 19 may be controlled in a similar manner to control the rate at which steam and/or air is allowed to flow away from nozzle 22, towards the exhaust. Likewise, in certain embodiments, the control system 150 can control activation of the air source 30 or the steam source 14. For example, in some configurations, the air source 30 can be an air pump, which is controlled by the control system 150. Likewise, in some configurations, the steam source 14 can be a steam pump under control of the control system 150. In this manner, it is possible for a user of the system 10 to activate or deactivate one or more of the air source 30 and the steam source 14 to initiate, regulate, or halt the flow of air and/or steam.

As discussed above, the user interface 40 may further be used to purge the T-connection 29 and the steam and air conduit 15 of latent air resident in the passageway after previous heating or aeration operations. In some embodiments, the air valve 32 may be closed directly via the user interface 40 to halt the flow of air into the T-connection 29. Likewise, the steam valve 31 may be partially closed such that the steam flowing through the T-connection 29 into the steam and air conduit 15 does not reach a sufficient pressure to crack open the outlets 25 on the nozzle 22. In some embodiments, the exhaust valve 27 may be manipulated in conjunction with the steam valve 31 and the air valve 32 to facilitate a flow of steam and/or air towards the exhaust path 19. In other embodiments, the exhaust valve 27 may be manipulated exclusively to open a passageway towards the exhaust path 19. Once the exhaust valve 27 has been opened, the flow of steam may be diverted by the nozzle 22 down to the exhaust fitting 28, through the exhaust valve 27, and through the exhaust path 19. In this manner, it is possible to expel air resident in the conduits through the exhaust path 19 such that lingering air will not interfere with a subsequent heating or aeration operation. Likewise, the exhaust valve 27 may be manipulated via the user interface 40 to prevent the flow of steam and/or air from flowing towards the exhaust path 19, allowing the pressure within the steam and air conduit 15 to build. When the pressure in the steam and air conduit 15 reaches the cracking pressure of the outlets 25 disposed on the nozzle 22, the steam, air, or combination thereof may be permitted to flow into container assembly 12.

Once the flow of air and/or steam has reached a sufficient pressure to crack open the plurality of openings 25 disposed on the nozzle 22, the user interface 40 may be further manipulated to alter the proportionality of air and/or steam within the flow. For instance, a user of the system 10 may manipulate user interface 40 to alter the proportion of steam and/or air in the flow, as well as increase, decrease, or even halt the flow altogether. For instance, in certain implementations, the system may be configured such that when the user interface 40 is manipulated to deliver a flow of air, the flow of steam is halted, or reduced to a minimal level to facilitate aeration. As described above, the user interface 40 can be mechanically or electronically coupled with the control system 150, allowing the user to affect the operation of the various valves through control system 150.

Also depicted in FIG. 4 is the display 70, adjacent the user interface 40. In certain configurations, the display 70 can be viewed by a user of the system to observe certain characteristics of the liquid residing in the container assembly 12. For instance, the display 70 may be configured to depict the temperature of the liquid residing in the container assembly 12. Likewise, in certain configurations, the display 70 can be configured to display the duration of air or steam delivery. For instance, in certain configurations the display 70 can be configured to activate when a flow of air is initiated through the T-connection 29 to display the duration of air delivery. As described above, certain configurations of the beverage preparation system include the control system 150. The control system 150 can be coupled to the air valve 32. In this manner, the control system 150 is able to transmit information relating to the status of the air valve 32 to the display 70. Advantageously, this allows the display 70 to display how long air valve 32 has permitted a flow of air to enter steam and air conduit 15. In a similar manner, the control system 150 can be coupled to one or more of steam valve 31, or exhaust valve 27 to monitor and transmit the duration of actuation, thereby allowing a user of the system 10 to determine how long a flow of steam has been allowed to persist, or how long a flow of steam and/or air has been allowed to travel into the exhaust path 19.

Figure 7:
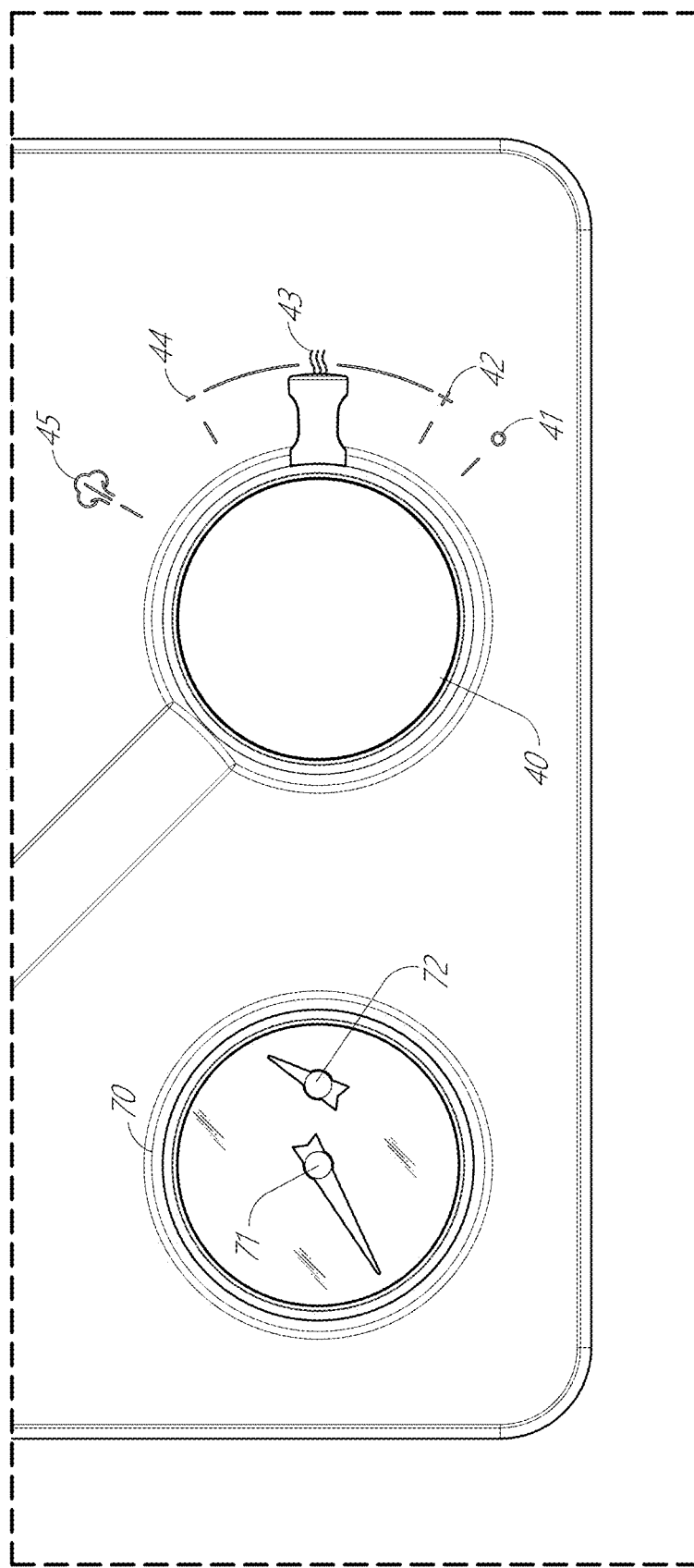
FIG. 7 depicts a top view of a user interface and display for use in an embodiment of a beverage preparation system.

FIG. 7 depicts in more detail the control apparatus 40 that can be used to regulate the flow of gas and/or vapor through the system 10. As depicted in FIG. 7, the control apparatus 40 can be implemented as a dial or knob. In various implementations, and as described above, the control apparatus 40 can be electronically connected to the control system 150. The control system 150, in turn, can be configured to actuate the valves to control the flow of steam and/or air into container assembly 12. FIG. 6 also illustrates the display 70, which in the illustrated embodiment can be in the form of a gauge with two dials 71, 72 (described in more detail below).

Using the control apparatus 40, a user of the system may affect the pressure within the air and steam conduit 15 by modulating the flow of steam from the steam source 14, air from the air source 30, or the flow of air and/or steam towards the exhaust path 19. When the pressure within the air and steam conduit 15 is reduced below the cracking pressure of the outlets 25 disposed on nozzle 22, the flow of steam and air into the pitcher 9 may cease. Moreover, by reducing the rate at which air and/or steam is introduced into the steam and air conduit 15, or by increasing the rate at which air and/or steam is allowed to flow into the exhaust passage 19, a user may control the speed at which the liquid residing in the pitcher 9 is heated, or the degree of aeration achieved.

In other embodiments, the control system 150 may be configured to automatically control the operation of the control apparatus 40, with limited or no user intervention. For instance, in certain configurations, a user may select a predefined temperature, and the control system 150 will cause the delivery of steam from the steam source 14 to cease automatically when the predefined temperature is reached. Likewise, certain implementations are configured to provide a certain amount of time, or a certain amount of flow, that gas and/or vapor is allowed to flow into the container assembly 12. In some embodiments, the user input device may allow a barista to customize the physical characteristics of a given beverage, such as temperature or foam density. In some implementations, after introducing milk into the container assembly 12, the system 10 waits for a user to signal, via the user input device, that the steam introduction process should begin. In certain variants, after introducing liquid into the container assembly 12, the system 10 automatically begins introducing steam into the container assembly 12. The automatic introduction can occur substantially immediately after the introduction of liquid finishes, or after a delay has elapsed after the introduction of milk has finished.

In a similar manner, the system can be configured to perform a wide variety of functions automatically. For instance, in some embodiments, the system can be configured to detect the size of the container assembly 12 and choose an appropriate steaming and/or aeration sequence. Similarly, the system can be configured to automatically halt the steaming and/or aeration procedures when a predefined stop-point has been reached. A user may set a predefined temperature, for instance, by rotating a radially mounted dial disposed on the outside perimeter of control apparatus 40. By rotating the radially mounted dial, a user of the system 10 may select a preferred shut-off temperature for a particular aeration and heating operation. Likewise, the system can be configured to automatically stop the heating operation once a predefined period of time has been allowed to elapse, or to automatically halt the aeration procedure once a predefined foam characteristic has been achieved. Moreover, the control system 150 can be configured to return the aforementioned valves to a default position after the aeration or heating operation has concluded, or after the container assembly 12 has been removed from the system 10 for a period of time. Likewise, the control system 150 can be configured to halt the aeration or heating operation if the control system's communication with the aforementioned valves is interrupted or compromised, or if the user of the system 10 attempts to perform a function outside of standard operational parameters, such as removal of pitcher 9 during a steaming operation, or a user attempting to exceed predefined temperature or time limits, among other possibilities. In certain embodiments, the control system 150 may be programmed with various steaming and/or aeration profiles to facilitate the production of certain beverages.

Also depicted in FIG. 7 is the gauge 70. The gauge 70 may display various characteristics of the liquid residing in the container assembly. For instance, the gauge in FIG. 7 is configured to includes a temperature dial 71 and time dial 72. Specifically, the temperature dial 71 is configured to depict the temperature of the liquid residing in dispensing unit. Likewise, the time dial 72 is configured to depict the air pump's duration of operation. In this manner, it is possible for a user of the system to determine if the optimal temperature of the liquid residing in the container assembly 12 has been reached, and to estimate the foam characteristics of the liquid based on the air pump's displayed period of activity. However, the display 70 may be implemented in a variety of manners to show various characteristics of the liquid. For instance, the display 70 may be configured to depict the pressure of the liquid residing in dispensing unit. In addition, in modified arrangements, the dials can be replaced with digital displays or bars or other visual indicators.

Depicted in FIGS. 9A-E are views of the control knob 40 in certain operational positions. As discussed above, a user of the system may use the control knob 40 to initiate, halt, modulate, or otherwise regulate the flow of gas and/or vapor into the dispensing unit. In this manner, a user of the system may ensure that liquid residing in container assembly exhibits certain desired characteristics, such as a preferred temperature and foam characteristics.

Figure 9A:
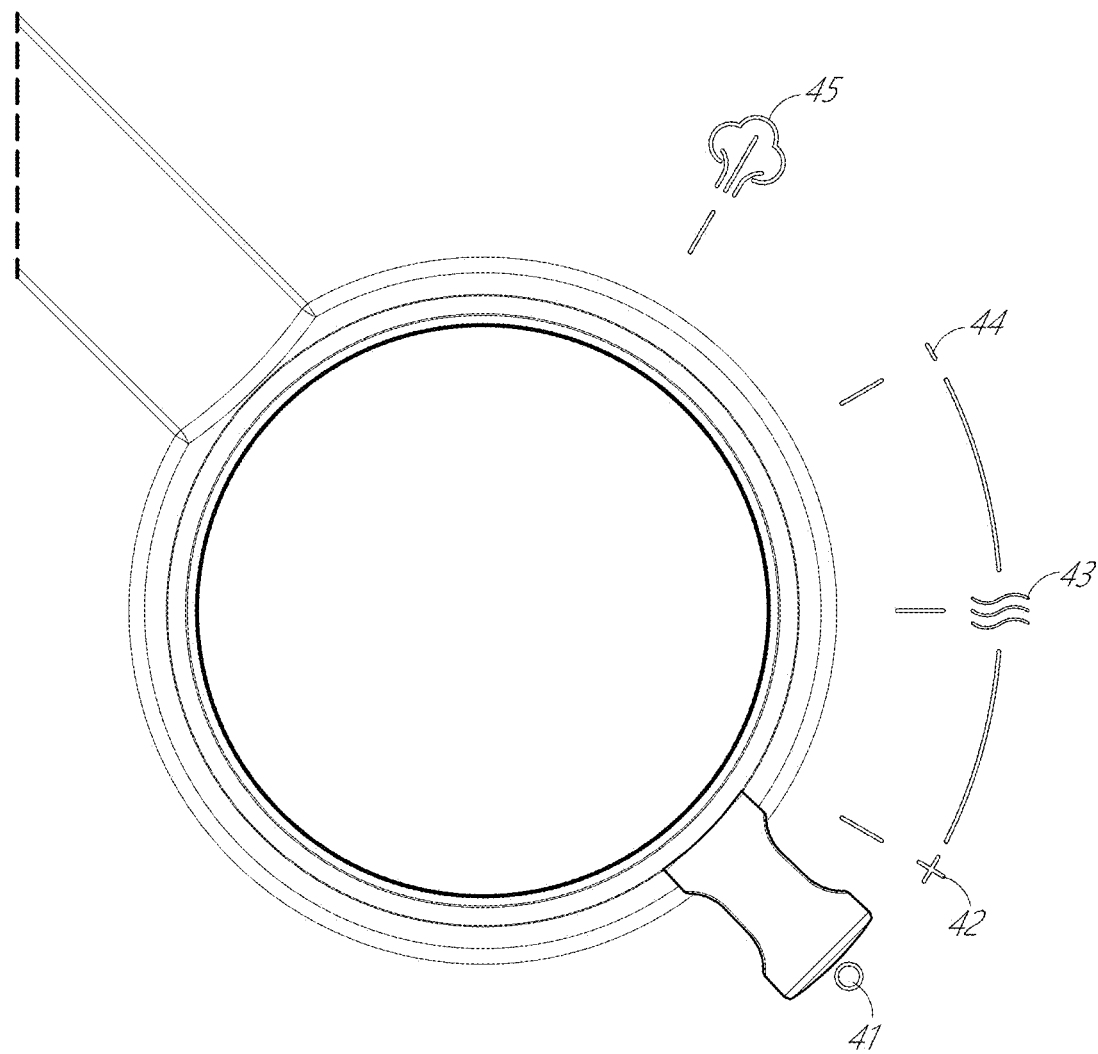
FIGS. 9A-E depict various operational states of a control knob for use in a beverage preparation system.

The control knob depicted in FIG. 9A is set to a first position 41 out of a plurality of positions. In position 41, the system can be configured to halt the flow of both steam and air into dispensing unit. Accordingly, control knob 40 may be rotated to position 41 after the heating and aeration operation has been completed. Similarly, position 41 may represent an "off" position which may be used as a deactivation switch, an emergency shut-off, or as a default position for a system that is not currently in use.

Figure 9B:
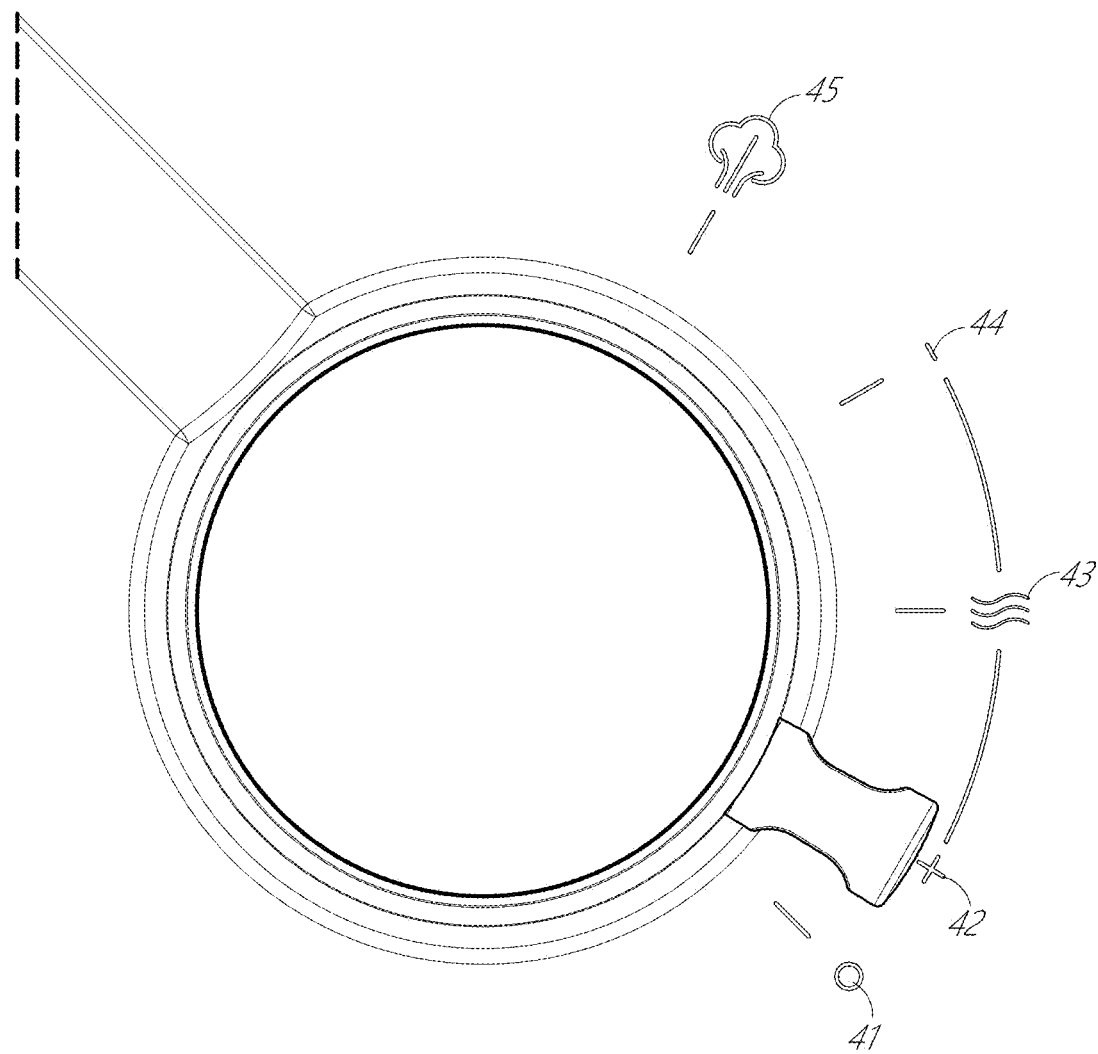

The control knob depicted in FIG. 9B is set to a second position 42 out of a plurality of positions. In position 42, the system can be configured to maximize the flow of steam into the dispensing unit. In this manner, the flow of steam into container assembly can be increased, reducing the amount of time it takes for the liquid residing in container assembly to reach the desired temperature.

Figure 9C:
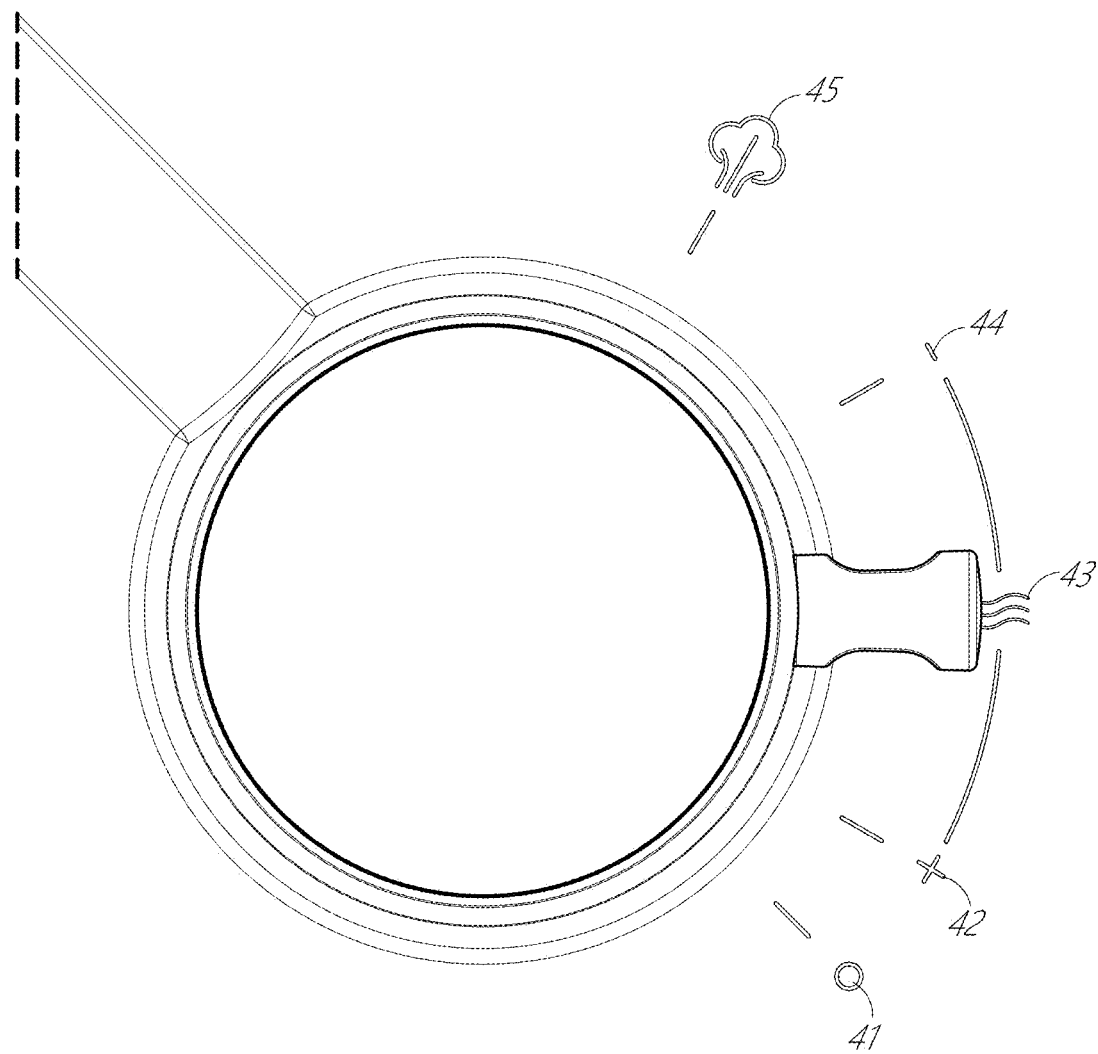

Likewise, as depicted in FIG. 9C, the control knob can be oriented to a third position 43 out of a plurality of positions. When in the position 43 of the plurality of positions, the system can be configured to deliver an intermediate or default flow of steam. An intermediate flow of steam may be less than the maximum flow of steam, but more than the minimum flow of steam discussed below.

Figure 9D:
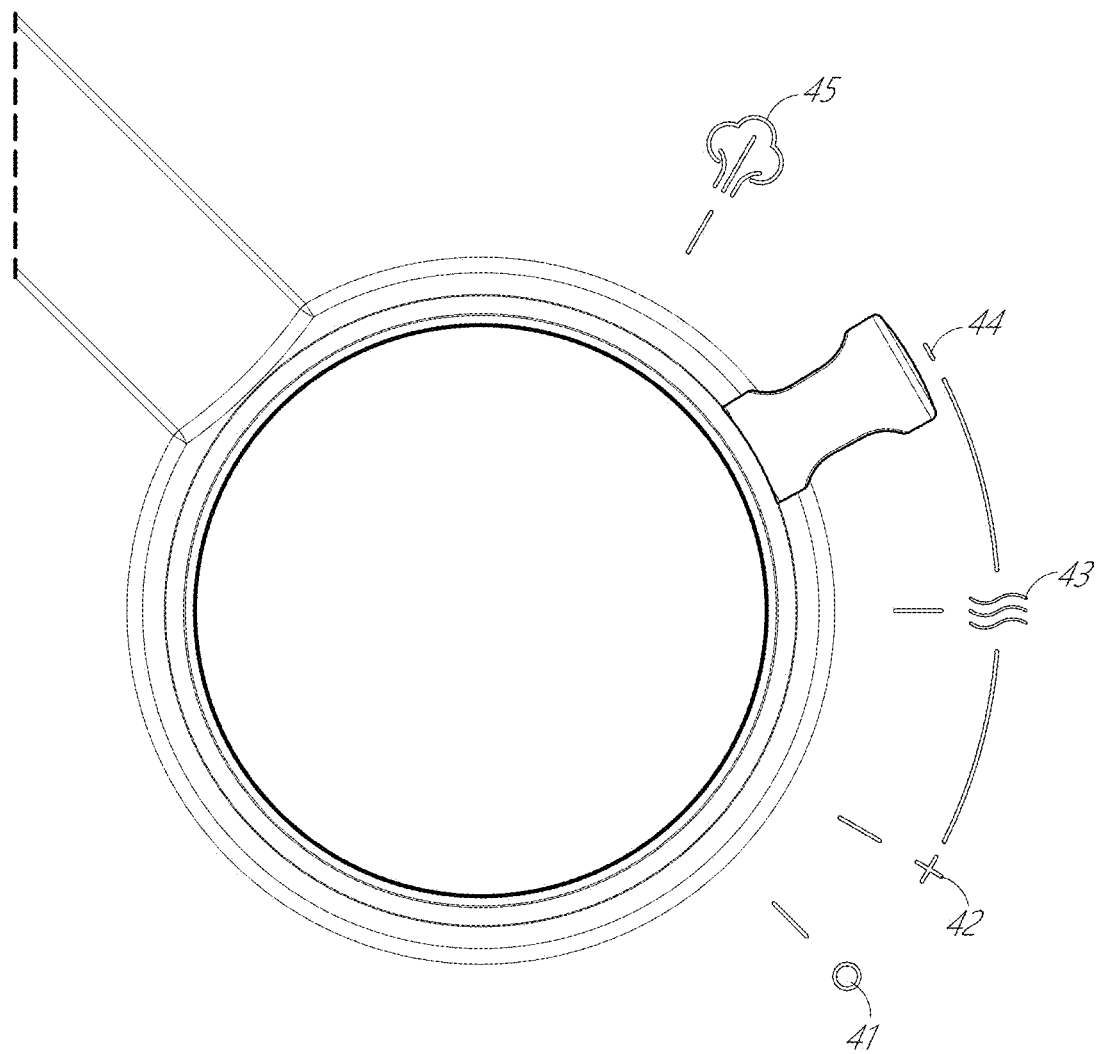

Depicted in FIG. 9D, the control knob is oriented in a fourth position 44 of a plurality of positions. The position 44 may represent a minimum flow of steam. For instance, in some embodiments, the minimum flow of steam may be the minimum flow necessary to achieve the cracking pressure of the nozzle.

In some embodiments, the region between FIGS. 9B, 9C, and 9D may be an analog region wherein an incremental adjustment in the dial may result in an incremental adjustment in the flow rate of steam. For instance, in certain embodiments, the control knob may be rotated continuously from position 44 to position 42, resulting in a correspondingly continuous increase in the rate at which steam is delivered into the dispensing unit. In alternative embodiments, there may be a finite number of demarcated locations, where each distinct position produces a distinct rate of flow, but where substantially no change in flow rate is observed when the dial is moved to an intermediate position between the demarcated locations.

Figure 9E:
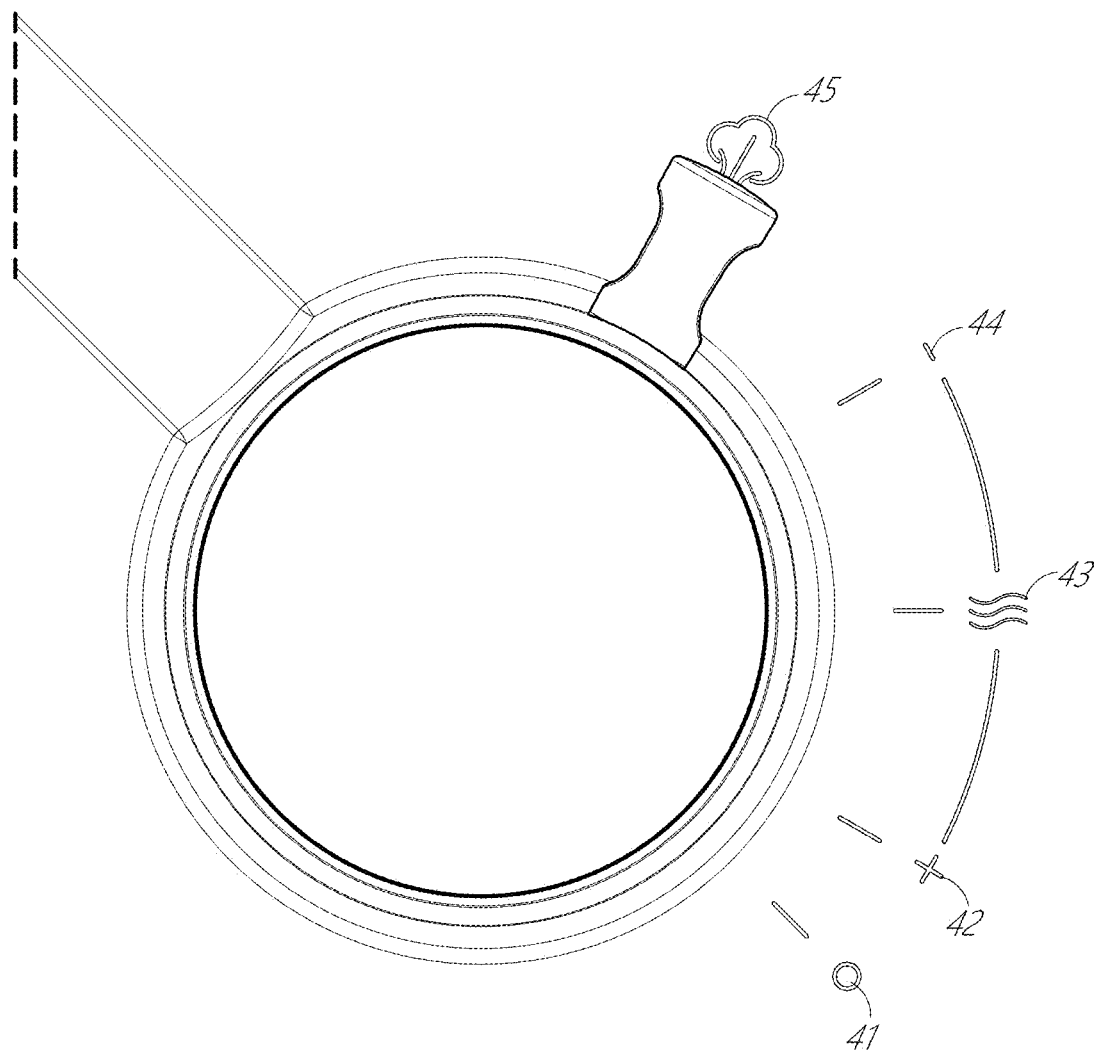

Depicted in FIG. 9E is a control knob oriented in a fifth position 45 of a plurality of positions. Position 45 may be an aeration position wherein when the control knob is moved to the corresponding position, a flow of air is introduced into the dispensing unit. In certain embodiments, in the fifth position a combination of air and a flow of steam can be introduced into the dispensing unit in the fifth position. It should be appreciated that the designation of certain positions as "first", "second", "third", "fourth" and "fifth" is used for convenience in the description and the order of such designations can modified such that, for example, the "fifth position 45" can be described as the "second position" as reflected in the claims.

Alternate configurations and variations on the foregoing may be implemented as well. For instance, in some embodiments, the system can be configured to deliver substantially no air into container assembly when the control knob is oriented towards positions 41-44, and only deliver air into container assembly when the control knob is oriented towards position 45, as depicted in FIG. 9E. In alternate embodiments, the system can be configured to deliver a substantially continuous flow of air when the control knob is oriented towards positions 41-44, and to increase the flow of air when the control knob is oriented towards position 45. Moreover, in certain implementations, the control knob may have a plurality of dials corresponding to a desired flow of air or steam.

Figure 8:
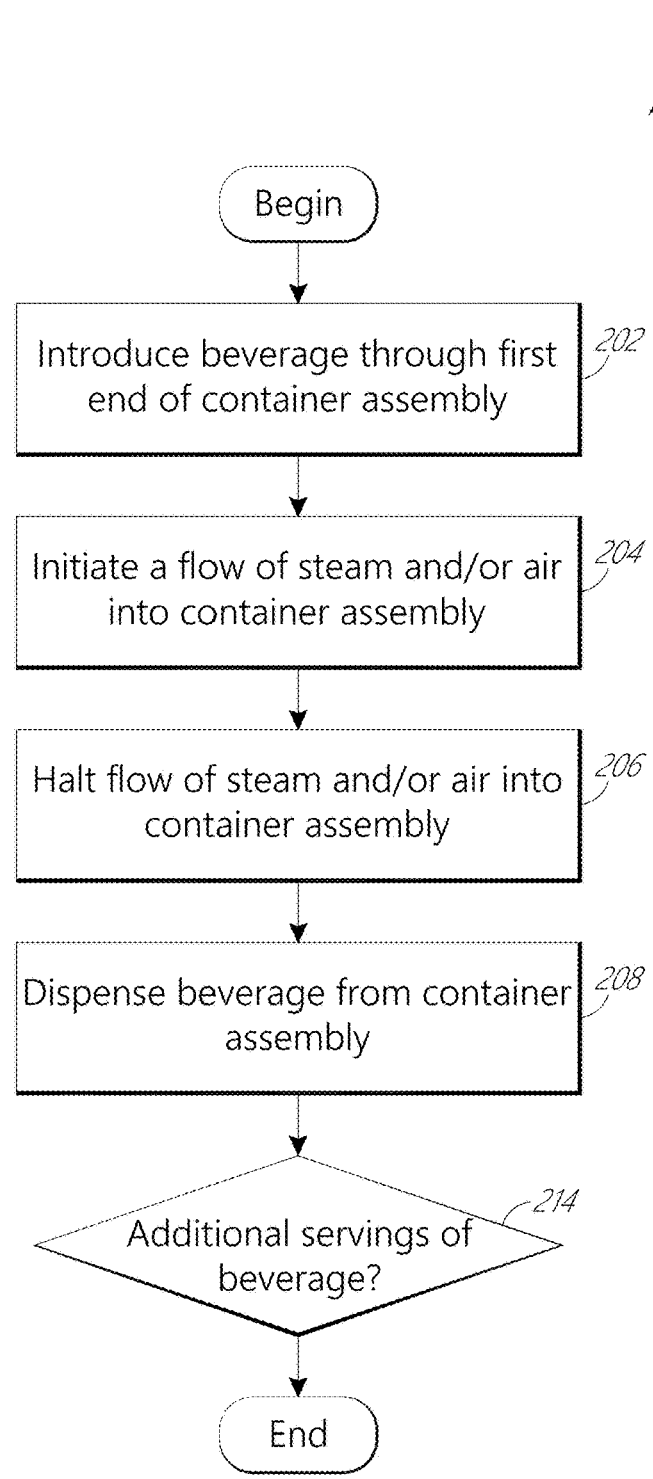
FIG. 8 depicts an example flow chart embodying methods for use with a beverage preparation system.

FIG. 8 illustrates an example method 200 related to various beverage preparation systems. As shown, in some embodiments, the method 200 includes introducing a beverage through the open end 18 of the pitcher 9, such as the first (e.g., top) end 202. This can be performed when the pitcher 9 is removably coupled with the base 24. Some embodiments include receiving, in the pitcher 9, at least about 1 serving of beverage. Some embodiments include receiving, in the pitcher 9, at least about 500 mL of beverage, though the precise amounts may be varied widely within the scope of this disclosure. For instance, certain variants include filling a substantial volume of the pitcher 9 with the beverage, such as at least about: 75%, 80%, 85%, 90%, 95%, percentages between the aforementioned percentages, or other percentages. Before block 202, some embodiments include preparing the beverage and/or transporting the beverage to the container assembly 12.

The method 200 can include initiating a flow of air, steam, or a combination thereof, into the container assembly 12 to heat and/or aerate a beverage residing inside 204. For example, the container assembly 12 can receive a flow of steam from a steam source 14, such as through the operation of one or more check valves as described above. In this manner, the steam may flow through at least some, or substantially all, of the depth of the liquid residing in the container assembly 12. Accordingly, heat may be transferred from the steam into the beverage residing within the container assembly 12. Likewise, the flow of air can be adjusted to incorporate different amounts of air to aerate the beverage. By allowing the flow of gas and vapor to be altered and adjusted, it is possible to achieve a variety of desired consistencies. For instance, by allowing a large amount of air to flow into container assembly to aerate the beverage for a prolonged period of time, such as about 10 seconds, 15 seconds, or 20 seconds, a foam having a crunchy consistency may be produced. Alternatively, the flow can be adjusted such that a lesser amount of air is introduced into container assembly for a short period of time, such as about 2 seconds, about 3 seconds, about 4 seconds, about 5 seconds, about 6 seconds, about 7 seconds, about 8 seconds, or any value therein. In this manner, a foam having a silky or smooth consistency may be achieved. The system 10 can be configured to heat the beverage in a similar manner. For instance, a large volume of steam may be introduced rapidly into the container assembly 12 to heat the beverage therein quickly. Alternatively, the rate of flow may be adjusted such that the temperature increase is more gradual.

Once the desired temperature or form characteristics are achieved, the flow of steam and/or air into the container assembly 12 may be terminated. In some embodiments, the user may manually halt the flow of air and/or steam, through for instance, a user interface knob, dial, or lever. In some embodiments, the system 10 can be configured to automatically halt the flow of steam once a predefined temperature has been reached, or has been allowed to persist for a predefined period of time. For instance, in some embodiments the flow of steam may be allowed to persist for a period of about 25 seconds, 26 seconds, 27 seconds, 28 seconds, 29 seconds, 30 seconds, or any value therein. Alternatively, in certain configurations, the system can be configured to automatically halt the flow of steam once a predefined temperature has been reached, such as about 120° F., 125° F., 130° F., 140° F., 145° F., 150° F., 155° F., 160° F., 165° F., 170° F., 175° F., 180° F., or any value therein. Advantageously, the system 10 can also be configured to monitor the change in temperature over time, and adjust steam flow characteristics accordingly. For instance, in some configurations, the system 10 can detect that the temperature of the liquid residing in the pitcher 12 is increasing rapidly. From the rapid temperature increase, the system 10 can infer that a small volume of liquid has been introduced into the pitcher 12 for heating, and reduce the flow of steam accordingly. Moreover, the system 10 can be configured to detect the size or type of pitcher 12 currently in use, and to adjust the initial air and/or steam flow values to be used in a particular heating or aeration operation. For instance, the system 10 can be configured to detect that a small volume pitcher 12 is in use and reduce the initial flow rate of steam and/or air accordingly. Likewise, in certain configurations, the system can detect that a large volume pitcher 12 has been placed upon the seat 101 and automatically increase the flow rate of steam and/or air to accommodate the anticipate larger volume of liquid. In addition, as noted above, in some embodiments, the system 10 can be configured to stop and/or prevent the initiation of an aeration and/or heating operation if communication with the temperature sensor is interrupted.

In additional variants, the system 10 can be configured to automatically halt the flow of air once a desired consistency has been achieved. In other embodiments, it can be preferable to allow the user of the system 10 to control and halt the flow of steam manually once the temperature or consistency desired by the user has been reached. For instance, in certain configurations, a user of the system may alter the flow of air and steam such that each is delivered intermittently for varying periods of time to arrive at a desired foam consistency and temperature. By allowing a user to control various aspects of the system's operation, a more pleasing customer experience can be created by allowing a customer to view their beverage being produced and by introducing theatrical elements into the customer experience.

As shown in FIGS. 10A and 10B, in some configurations, at least one of the base 24 or seat 101 may be equipped with one or more magnets 171 to facilitate placement of the base 24 on the seat 101. For instance, in certain configurations, a first magnet 171a may be incorporated in the base 24. Likewise, a second magnet 171b may be incorporated in the seat 101. In certain configurations, the polarity of the magnet 171a disposed in the base may be opposite the polarity of the magnet 171b disposed in the seat 101, as depicted in FIG. 10A. In this manner, incorrect orientation of the base 24 when placed on seat 101 can be prevented. In certain configurations, a plurality of magnets 171 may be disposed within base 24 and/or seat 101. For instance, in some configurations, at least two magnets 171a are incorporated in the base 24, and at least two magnets 171b are incorporated in seat 101, as depicted in FIG. 10B. In some embodiments, magnets can also be used to detect the presence of the pitcher 12 on the base 24. For instance, in certain configurations, a third magnet 181 may be disposed within the pitcher 12. A corresponding magnetic proximity sensor 182 may be disposed within seat 101. In this manner, the presence or absence of the pitcher 12 can be detected by the system 10. Advantageously, this allows the system 10 to detect the absence of pitcher 12, and prevent the flow of air and or steam when the pitcher 12 is not housed on the seat 101. In this manner, it is further possible for the system to automatically halt the heating and/or aeration operation if the pitcher 12 is removed from the seat 101.

In some embodiments, the method 200 includes dispensing the beverage from the container assembly into a suitable receptacle 208.

As illustrated, the method 200 can include a decision block 214, which can ask whether there are additional beverage servings to be prepared and/or dispensed. If the answer is yes, then the method 200 can return to block 202 to introduce additional beverage into the container assembly and the method 200 can continue. In some embodiments, if the answer to the decision block 214 is no, then the method 200 ends.

As described above, beverage preparation system 10 may be used to prepare a wide assortment of café style beverages. For instance, in some embodiments, a user may introduce a portion of milk through the first end 18 of pitcher 9, disposed atop base assembly 24. In this manner, the liquid may be stored within container assembly 12. In some embodiments, additional modifications may be made to the liquid while it is resident within pitcher 9. For instance, in certain configurations it may be desirable to incorporate one or more shots of espresso into the beverage residing therein.

Once a desired amount of liquid has been introduced into container assembly 12, a user of the system 10 may manipulate the user interface 40 to initiate a flow of air and/or steam into the interior of the container assembly 12. For instance, in certain configurations, a user may rotate the user interface dial 41 to open one or more of steam valve 31, air valve 32, or exhaust valve 27 to facilitate a flow of steam from steam source 14, and a flow of air from air source 30, into air and steam conduit 15. In some configurations, it may be advantageous to purge air and steam conduit 15 of latent air that may still be resident in the conduit from a previous heating or aeration operation. Accordingly, a user may manipulate the user interface 40 to modulate the exhaust valve 27. For example, a user may open the exhaust valve 27 to prevent or inhibit a build-up of pressure within the steam and air conduit 15 sufficient to "crack" open the outlets 25 on the nozzle 22. In this manner, the flow of steam and/or air will flow through the steam and air conduit 15, but will be prevented from escaping the conduit through the nozzle 22. Thus, the steam and/or air will be forced through the annular exhaust gap 75 and into the exhaust conduit 19, thereby purging lingering air resident in the air and steam conduit 15. Likewise, by manipulating the user interface 40 to close the exhaust valve 27, a user may facilitate the build-up of pressure within the air and steam conduit 15. Accordingly, when the pressure in the air and steam conduit 15 reaches the cracking pressure of the outlets 25 disposed on the nozzle 22, the flow of steam and/or air may proceed into the container assembly 12.

Once a flow of steam and/or air has been initiated into the container assembly 12, a user may manipulate the user interface 40 to control the characteristics of the flow of steam and/or air. For instance, a user may increase the flow of steam to increase the temperature of the liquid residing in the container assembly 12 more quickly. Likewise, a user may increase the flow of air to produce a foam having certain desired characteristics. For example, in some configurations, the beverage preparation system 10 may be configured to substantially halt the flow of air when the user initiates a flow of steam into the container assembly 12 to facilitate heating of the beverage residing therein. In a similar manner, the system 10 can be configured to substantially halt the flow of steam when the user initiates a flow of air into the container assembly 12. In other embodiments, the system 10 may be configured to deliver a certain minimum flow of steam when the user initiates a flow of air into the container assembly 12. In this manner, the degree of aeration may be monitored by displaying the duration of activity of an air pump, or other suitable apparatus for delivering a flow of air. Advantageously, this configuration allows a user to alternatively steam and aerate a liquid or beverage residing in the container assembly 12 to produce a wide variety of beverages, each having unique foam and temperature characteristics.

Once the liquid residing in container assembly 12 has achieved the desired characteristics, container assembly 12 may be removed from seat 101 and transported to any suitable location. For instance, a barista may transport the container assembly to a customer to deliver a serving of a beverage.

The control system 150 and/or any components thereof may include a computer or a computer readable storage medium or computer readable memory that has stored thereon executable instructions and there can be one or more processors in communication with the computer readable memory that are configured to execute the instructions to implement the operation and implement the various methods and processes described herein. The control system can include computing device that can generally include computer-executable instructions, where the instructions may be executable by one or more computing devices. Computer-executable instructions may be compiled or interpreted from computer programs created using a variety of programming languages and/or technologies, including, without limitation, and either alone or in combination, Java, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A computer-readable media (also referred to as a processor-readable medium or computer readable memory) includes any non-transitory (e.g., tangible) medium that participates in providing data (e.g., instructions) that may be read by a computer (e.g., by a processor of a computer).

Certain Terminology

As used herein, the term "beverage" has its ordinary and customary meaning, and includes, among other things, any edible liquid or substantially liquid substance or product having a flowing quality (e.g., juices, coffee beverages, teas, frozen yogurt, beer, wine, cocktails, liqueurs, spirits, cider, soft drinks, flavored water, energy drinks, soups, broths, combinations of the same, or the like).

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes, or tends toward, a particular value, amount, or characteristic. As an example, in certain embodiments, as the context may dictate, the term "generally parallel" can refer to something that departs from exactly parallel by less than or equal to 20 degrees and/or the term "generally perpendicular" can refer to something that departs from exactly perpendicular by less than or equal to 20 degrees.

Overall, the language of the claims is to be interpreted broadly based on the language employed in the claims. The claims are not to be limited to the non-exclusive embodiments and examples that are illustrated and described in this disclosure, or that are discussed during the prosecution of the application.

Also, although there may be some embodiments within the scope of this disclosure that are not expressly recited above or elsewhere herein, this disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and features are described herein. Not necessarily all such aspects, advantages, and features may be achieved in accordance with any particular embodiment. For example, some embodiments of any of the various disclosed systems include the container assembly and/or include pluralities of the container assembly; some embodiments do not include the container assembly. Those skilled in the art will recognize that the disclosure may be embodied or carried out in a manner that achieves one advantage or a group of advantages as taught herein without necessarily achieving other advantages as may be taught or suggested herein.

Some embodiments have been described in connection with the accompanying drawings. The figures are drawn to scale where appropriate, but such scale should not be interpreted to be limiting. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Also, any methods described herein may be practiced using any device suitable for performing the recited steps.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

In summary, various illustrative embodiments and examples of beverage preparation systems and methods have been disclosed. Although the systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

What is claimed is:

1. A beverage preparation system comprising:
   a base comprising an upper surface with a steam outlet; and
   a container assembly comprising an interior, an open upper end, and a closed lower end, the closed lower end including an opening, the container assembly including a nozzle extending through the opening, the nozzle including an upper end extending into the interior of the container assembly and having at least one aperture that forms a check valve for allowing steam to flow through the nozzle and into the container assembly, the at least one aperture being formed on a wall of the nozzle such that the at least one aperture and the wall of the nozzle form the check valve;
   the container assembly and the base configured such that when the container assembly is engaged with the base, steam can flow through the steam outlet and into the nozzle with the at least one aperture configured to open when the pressure in the nozzle exceeds a threshold pressure and when the container assembly is disengaged from the base the at least one aperture is closed to inhibit liquid in the interior of the container assembly from exiting the container assembly through the nozzle; wherein the nozzle is formed of a single piece of elastomeric material, wherein a bottom end of the nozzle forms a gasket that engages a valve seat formed in the base, the valve seat surrounding the gasket to form a sealed connection positioned outside the container assembly.

2. The system of claim 1, wherein the nozzle is formed of an elastomeric material.

3. The system of claim 1, wherein the at least one aperture in the nozzle comprises at least one slit formed in the wall of the nozzle.

4. The system of claim 1, wherein the at least one aperture in the nozzle orients the flow of steam substantially horizontally.

5. The system of claim 1, further comprising an exhaust path with an exhaust inlet on the base, wherein when the container assembly is placed on the base, the nozzle connects the steam outlet to exhaust inlet.

6. The system of claim 1, further comprising an exhaust valve for opening and closing the exhaust path.

7. The system of claim 1, wherein at least one aperture of the nozzle is configured to remain closed when steam is supplied to the nozzle while the exhaust path is open.

8. The system of claim 3, wherein the at least one slit formed in the wall of the nozzle is configured to crack open in response to a flow of air and/or steam through the nozzle.

9. The system of claim 3, wherein the at least one slit formed in the wall of the nozzle is configured to crack open in response to a flow of air and/or steam through the nozzle exceeding a threshold pressure of about 1 psi.

* * * * *